United States Patent
Suzukake

(10) Patent No.: US 10,043,161 B2
(45) Date of Patent: Aug. 7, 2018

(54) INFORMATION PROCESSING DEVICE, INFORMATION PROCESSING METHOD, AND INFORMATION PROCESSING PROGRAM PRODUCT

(75) Inventor: Wataru Suzukake, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 556 days.

(21) Appl. No.: 14/411,255

(22) PCT Filed: Jun. 29, 2012

(86) PCT No.: PCT/JP2012/066813
§ 371 (c)(1),
(2), (4) Date: Dec. 24, 2014

(87) PCT Pub. No.: WO2014/002279
PCT Pub. Date: Jan. 3, 2014

(65) Prior Publication Data
US 2015/0206105 A1    Jul. 23, 2015

(51) Int. Cl.
*G06Q 20/06* (2012.01)
*G06Q 20/10* (2012.01)
*G06Q 20/32* (2012.01)
*G06Q 20/36* (2012.01)
*G06F 3/0486* (2013.01)

(52) U.S. Cl.
CPC ....... *G06Q 20/0655* (2013.01); *G06F 3/0486* (2013.01); *G06Q 20/105* (2013.01); *G06Q 20/3226* (2013.01); *G06Q 20/3676* (2013.01)

(58) Field of Classification Search
CPC ........ G06Q 20/04; G06Q 20/10; G06Q 20/20; G06Q 20/403; G06Q 20/00
USPC ........... 705/39, 37, 38, 65, 80, 42; 235/379, 235/380, 381; 345/173, 684; 715/743,
(Continued)

(56) References Cited

U.S. PATENT DOCUMENTS

| | | | | |
|---|---|---|---|---|
| 5,283,829 A | * | 2/1994 | Anderson | G06Q 20/00 235/379 |
| 5,293,319 A | * | 3/1994 | DeSha | G07B 17/00435 705/408 |

(Continued)

FOREIGN PATENT DOCUMENTS

| | | | | |
|---|---|---|---|---|
| JP | 2004171527 | * | 6/2004 | G06K 17/00 |
| JP | 2000207509 | * | 1/2010 | |

OTHER PUBLICATIONS

International Search Report for PCT/JP2012/066813 dated Aug. 14, 2012 [PCT/ISA/210].

*Primary Examiner* — Tien C Nguyen
(74) *Attorney, Agent, or Firm* — Sughrue Mion, PLLC

(57) ABSTRACT

An object is to provide a mechanism for giving an instruction to transfer value by an operation which is close to exchange of cash in terms of sense. A portable terminal incorporates a general-purpose IC chip storing a terminal-side value balance and can connect to an electronic money server via the Internet. In the electronic money server, a server-side value balance corresponding to the portable terminal is stored. The electronic money server and the portable terminal operate in cooperation with each other, and value can be transferred between the terminal-side value balance and the server-side value balance. The portable terminal displays a value transfer screen by a user interface and can accept the amount of value to be transferred and the direction of transfer from the value transfer screen by a user's touch operation.

16 Claims, 15 Drawing Sheets

(58) Field of Classification Search
USPC .......... 715/750, 835, 859; 703/27; 707/501, 707/526; 709/200, 203; 455/435.1, 457
See application file for complete search history.

(56) References Cited

U.S. PATENT DOCUMENTS

| | | | | |
|---|---|---|---|---|
| 5,918,239 A * | 6/1999 | Allen | ................ | G06F 17/30899 707/E17.119 |
| 5,950,197 A * | 9/1999 | Beam | ................ | G06F 8/78 |
| 6,018,345 A * | 1/2000 | Berstis | ................ | G06F 3/04892 345/667 |
| 6,088,707 A * | 7/2000 | Bates | ................ | G06F 17/30899 707/E17.119 |
| 6,362,840 B1 * | 3/2002 | Burg | ................ | G06F 3/0481 715/708 |
| 6,867,789 B1 * | 3/2005 | Allen | ................ | G06K 9/2054 705/35 |
| 7,356,507 B2 * | 4/2008 | Bezos | ................ | G06Q 20/00 705/40 |
| 7,523,055 B2 * | 4/2009 | Anderson | ................ | G06Q 20/04 705/30 |
| 8,374,958 B2 * | 2/2013 | Blott | ................ | G06Q 30/06 382/100 |
| 9,824,376 B1 * | 11/2017 | Amacker | ................ | G06Q 30/06 |
| 2002/0042778 A1 * | 4/2002 | Nel | ................ | G06Q 20/04 705/42 |
| 2002/0120567 A1 * | 8/2002 | Caplan | ................ | G07F 17/0014 705/40 |
| 2002/0130175 A1 * | 9/2002 | Nakajima | ................ | G06Q 20/04 235/379 |
| 2003/0093321 A1 * | 5/2003 | Bodmer | ................ | G06Q 30/06 705/26.41 |
| 2003/0135463 A1 * | 7/2003 | Brown | ................ | G06Q 20/04 705/44 |
| 2003/0222138 A1 * | 12/2003 | Oppenlander | ................ | G06Q 20/10 235/380 |
| 2004/0006536 A1 * | 1/2004 | Kawashima | ................ | G06Q 20/04 705/39 |
| 2004/0039701 A1 * | 2/2004 | Nakamura | ................ | G06Q 20/04 705/42 |
| 2004/0044622 A1 * | 3/2004 | Blott | ................ | G06Q 20/102 705/40 |
| 2004/0117306 A1 * | 6/2004 | Karaoguz | ................ | G06Q 20/102 705/40 |
| 2004/0199474 A1 * | 10/2004 | Ritter | ................ | G06Q 20/00 705/65 |
| 2004/0230535 A1 * | 11/2004 | Binder | ................ | G06Q 20/04 705/64 |
| 2005/0188316 A1 * | 8/2005 | Ghanamgari | ................ | G06F 3/0386 715/743 |
| 2006/0259390 A1 * | 11/2006 | Rosenberger | ................ | G06Q 20/04 705/35 |
| 2007/0168260 A1 * | 7/2007 | Cunescu | ................ | G06Q 20/00 705/26.1 |
| 2007/0252003 A1 * | 11/2007 | Goldring | ................ | G07F 11/00 235/381 |
| 2007/0281689 A1 * | 12/2007 | Altman | ................ | G06Q 30/0207 455/435.1 |
| 2012/0182325 A1 * | 7/2012 | Hayashi | ................ | G06F 3/04883 345/684 |

* cited by examiner

Fig.5

USER DB FOR SERVER-SIDE ELECTRONIC MONEY NUMBER

| USER ID | SERVER-SIDE ELEC-TRONIC MONEY NUMBER | SERVER-SIDE VALUE BALANCE | ... |
|---|---|---|---|
| 1 2 ... | 5 8 2 ... | ¥ 4, 8 5 5 | ... |
| ⋮ | ⋮ | ⋮ | ⋮ |

USER DB FOR TERMINAL-SIDE ELECTRONIC MONEY NUMBER

| USER ID | TERMINAL-SIDE ELEC-TRONIC MONEY NUMBER | ... |
|---|---|---|
| 6 3 ... | 7 9 5 ... | ... |
| ⋮ | ⋮ | ⋮ |

INFORMATION PROCESSING DEVICE, INFORMATION PROCESSING METHOD, AND INFORMATION PROCESSING PROGRAM PRODUCT

CROSS REFERENCE TO RELATED APPLICATIONS

This application is a National Stage of International Application No. PCT/JP2012/066813, filed on Jun. 29, 2012, the contents of all of which are incorporated herein by reference in their entirety.

TECHNICAL FIELD

The present invention relates to information processing devices, information processing methods, and information processing program products, and, for example, relates to what operates electronic money.

BACKGROUND ART

In recent years, the use of electronic money has become widespread. In electronic money, amount information called value is related to money value and fund settlement is performed by increasing or decreasing it.

In general, the user accesses a payment terminal installed in a store from his/her portable terminal by short-distance radio communication (near field radio communication) and gets payment processing by value.

For payment by value, there are a center management-type scheme by which the balance of value is stored in a database on the server's side and is reduced by access to the server at the time of payment and a stored value-type scheme by which an IC chip storing the balance of value is built into a portable terminal and payment is made by reducing the balance.

In the past, due to constraints of the communications capacity of the network, the stored value-type scheme by which the balance of value is stored in an IC chip of a portable terminal and payment is made locally between it and a payment terminal has been the mainstream; however, since the recent communications capacity of the network has been remarkably improved, it is expected that the center management-type scheme will become popular.

Therefore, it is expected that a portable terminal that complies with both schemes, the portable terminal having a built-in IC chip storing the balance of value and being capable of making payment also by the value balance on the server's side, will become widespread.

As described above, when a portable terminal that complies with both schemes is used, it would be convenient for the user if the value on the server's side can be transferred to the IC chip or the value stored in the IC chip can be transferred to the server's side.

As the technology to transfer the value on the server's side and the value on the IC chip's side bidirectionally, that is, the technology to store value on the server's side and on the IC chip's side and transfer the value on the server's side to the IC chip and transfer the value on the IC chip's side to the server, there is an "electronic trading system" of Patent Document 1.

This technology fills the value on the IC chip's side with the value stored on the server's side and adds the value stored on the IC chip's side to the value on the server's side at the time of payment.

CITATION LIST

Patent Literature

Patent Document 1: JP-A-2000-207509

DISCLOSURE OF INVENTION

Problem to be Solved by the Invention

The "electronic trading system" of Patent Document 1 is a mechanism that requests transfer of value by using payment terminal equipment that adopts a user interface which makes a person enter an amount to be transferred and a transfer instruction by an operation of buttons (a so-called numeric keypad) related to numbers and symbols (refer to FIG. 4 and so forth of Patent Document 1). As a result, the operation for giving an instruction to transfer value differs from exchange of cash in terms of sense, which makes this system non-user-friendly.

An object of the present invention is to provide a mechanism for giving an instruction to transfer value by an operation which is close to exchange of cash in terms of sense.

SUMMARY OF THE INVENTION

An exemplary embodiment of the present disclosure provides an information processing device comprising: a displaying means that displays one or more objects, each indicating a unit amount, in a predetermined position in a screen; a region identifying means that identifies a display region of the object, the display region including a user instruction position detected by a detecting means that detects a user instruction position on the screen; a direction identifying means that identifies a direction of a slide shift if, from a state in which the user instruction position is included in the identified display region, the user instruction position or another user instruction position detected by the detecting means is slid; and an instructing means that gives an instruction to perform transfer of value identified by using a transfer amount of value determined by using the unit amount indicated by the object corresponding to the identified display region and a transfer direction of value determined based on the identified direction of the slide shift.

Another exemplary embodiment of the present disclosure provides that the displaying means disposes two or more regions in the screen, the two or more regions respectively corresponding to two or more values, and displays the one or more objects in predetermined respective positions near an outer edge of the screen, if the other user instruction position is slid from a state in which the user instruction position is included in the identified display region, the direction identifying means identifies a direction from a first region indicating a rear region with respect to a travelling direction of the slide shift to a second region indicating a front region, and the instructing means determines a direction from a first value corresponding to the first region to a second value corresponding to the second region as the transfer direction of value.

Yet another exemplary embodiment of the present disclosure provides that the displaying means disposes two or more regions in the screen, the two or more regions respectively corresponding to two or more values, and displays the one or more objects in a position overlapping a boundary line or a boundary region of the two regions, if the user instruction position detected by the detecting means is slid from a state in which the user instruction position is not included in any of the identified display region, the region identifying means identifies a display region of the object including the user instruction position on a trajectory of the slide shift, if the user instruction position is further slid from a state in which the user instruction position is included in the identified display region, the direction identifying means identifies a direction from a first region indicating a rear region with respect to a travelling direction of the slide shift to a second region indicating a front region, and the instructing means determines a direction from a first value corresponding to the first region to a second value corresponding to the second region as the transfer direction of value.

Yet another exemplary embodiment of the present disclosure provides that the displaying means disposes two or more regions in the screen, the two or more regions corresponding to two or more values, and displays the one or more objects in the each region, if the user instruction position is slid from a state in which the user instruction position is included in the identified display region, the direction identifying means identifies a direction from a first region indicating a rear region with respect to a travelling direction of the slide shift to a second region indicating a front region, and the instructing means determines a direction from a first value corresponding to the first region to a second value corresponding to the second region as the transfer direction of value.

Yet another exemplary embodiment of the present disclosure provides that if the direction of the slide shift is identified by the direction identifying means multiple times by a predetermined point of time after the display region of the object is first identified by the region identifying means, the instructing means determines the transfer amount of value by using an accumulated amount which is obtained by performing addition of the unit amounts indicated by the objects corresponding to the display regions identified by the region identifying means a number of times the direction of the slide shift is identified by the direction identifying means.

Yet another exemplary embodiment of the present disclosure provides that the instructing means calculates an accumulated amount which is obtained by performing addition of the unit amounts a number of times the direction of the slide shift is identified by the direction identifying means from a point of time at which the display region is identified by the region identifying means for each unit amount indicated by the object corresponding to the display region identified by the region identifying means to a predetermined point of time and determines the transfer amount of value by using a total amount of the accumulated amounts.

Yet another exemplary embodiment of the present disclosure provides that the instructing means performs addition of the unit amounts as negative values a number of times a direction opposite to a direction identified first by the direction identifying means is identified.

Yet another exemplary embodiment of the present disclosure provides that if the direction identifying means identifies, at almost a same time, directions of a plurality of slide shifts occurred at almost a same time, a number of the slide shifts identified at almost the same time is counted as a number of times the direction of the slide shift is identified.

Yet another exemplary embodiment of the present disclosure provides that if a display region of a same object is consecutively identified multiple times by the region identifying means before the direction of the slide shift is identified by the direction identifying means, the instructing means determines the transfer amount of value by using an accumulated amount obtained by addition of the unit amount indicated by the object corresponding to the identified display region a number of times the display region is identified.

Yet another exemplary embodiment of the present disclosure provides that if the direction of the slide shift is identified by the direction identifying means multiple times, the instructing means calculates an accumulated amount obtained by addition of a unit amount a number of times a same display region is identified by the region identifying means from a predetermined point of time before a direction is identified for each of the directions of the slide shifts identified by the direction identifying means to a point of time at which the direction is identified, the unit amount indicated by the object corresponding to the identified display region, and determines the transfer amount of value by using a total amount of the accumulated amounts.

Yet another exemplary embodiment of the present disclosure provides that if a direction opposite to a direction identified first by the direction identifying means is identified, the instructing means performs addition of the unit amounts as negative values a number of times a display region is identified by the region identifying means before the opposite direction is identified by the direction identifying means.

Yet another exemplary embodiment of the present disclosure provides that if a plurality of different user instruction positions are detected by the detecting means at almost a same time, the region identifying means identifies display regions of a plurality of different objects, each including a corresponding one of the plurality of user instruction positions, if the plurality of user instruction positions or another user instruction position is slid from a state in which the plurality of different user instruction positions are included in the identified different display regions, the direction identifying means identifies the direction of the slide shift, and the instructing means determines the transfer amount of value by using the unit amounts indicated by the plurality of different objects corresponding to the identified different display regions.

Yet another exemplary embodiment of the present disclosure provides that the direction identifying means identifies a direction from the first region indicating a region including a position detected by the detecting means at a point of time before a point of time at which a position of the user instruction positions on a trajectory of the slide shift, the position on a boundary line or in a boundary region of two regions, is detected to the second region indicating a region including a position detected by the detecting means at a later point of time.

Yet another exemplary embodiment of the present disclosure provides that the direction identifying means identifies, by using a state of motion of the slide shift which is calculated from temporal changes in the user instruction position detected by the detecting means, the direction from the first region indicating a rear region with respect to a travelling direction of the slide shift to the second region indicating a front region.

Yet another exemplary embodiment of the present disclosure provides a determining means that determines whether or not at least one of a balance of electronic value stored on a server's side and a balance of electronic value stored on a side of a storing medium carried by a user is less than or equal to a predetermined amount or less than the predetermined amount; and a starting means that starts the displaying means if the determining means determines that at least one of the balance of electronic value stored on a server's side and the balance of electronic value stored on a side of the storing medium carried by a user is less than the predetermined amount or less than or equal to the predetermined amount.

Yet another exemplary embodiment of the present disclosure provides that the displaying means changes the unit amounts indicated by the objects displayed in the screen in accordance with at least one of a balance of electronic value stored on a server's side and a balance of electronic value stored on a side of a storing medium carried by a user.

Yet another exemplary embodiment of the present disclosure provides that the displaying means displays, in the screen, at least one object indicating, as a unit amount, an amount obtained by predetermined numerical calculation which is performed on at least one of a balance of electronic value stored on a server's side and a balance of electronic value stored on a side of a storing medium carried by a user.

Yet another exemplary embodiment of the present disclosure provides an information processing method performed by a computer, the method comprising: a display step of displaying one or more objects, each indicating a unit amount, in a predetermined position in a screen; a region identifying step of identifying a display region of the object, the display region including a user instruction position detected by a detecting means that detects a user instruction position on the screen; a direction identifying step of identifying a direction of a slide shift if the user instruction position or another user instruction position detected by the detecting means is slid from a state in which the user instruction position is included in the identified display region; and an instructing step of giving an instruction to perform transfer of value identified by using a transfer amount of value determined by using the unit amount indicated by the object corresponding to the identified display region and a transfer direction of value determined based on the identified direction of the slide shift.

Yet another exemplary embodiment of the present disclosure provides an information processing program product that makes a computer implement: a display function of displaying one or more objects, each indicating a unit amount, in a predetermined position in a screen; a region identifying function of identifying a display region of the object, the display region including a user instruction position detected by a detecting means that detects a user instruction position on the screen; a direction identifying function of identifying a direction of a slide shift if the user instruction position or another user instruction position detected by the detecting means is slid from a state in which the user instruction position is included in the identified display region; and an instructing function of giving an instruction to perform transfer of value identified by using a transfer amount of value determined by using the unit amount indicated by the object corresponding to the identified display region and a transfer direction of value determined based on the identified direction of the slide shift.

EFFECT OF THE INVENTION

According to the present invention, it is possible to give an instruction to transfer value by an operation which is close to exchange of cash in terms of sense.

BRIEF DESCRIPTION OF DRAWINGS

FIG. 5 is a diagram for explaining databases of the electronic money server;

DESCRIPTION OF EMBODIMENTS (1) Outline of an Embodiment

Figure 1A:
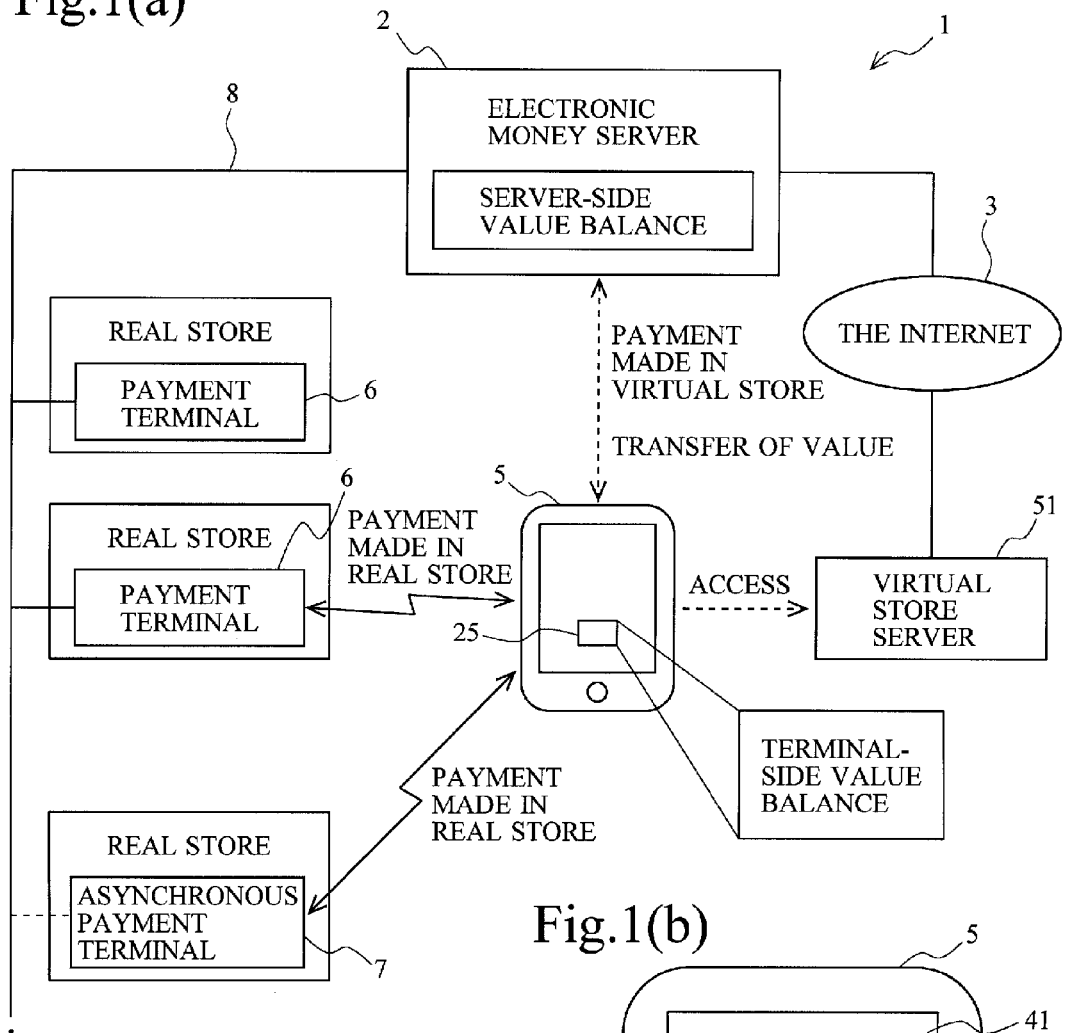
FIG. 1 is a diagram for explaining an electronic money system and a portable terminal.

A portable terminal 5 (FIG. 1(*a*)) incorporates a general-purpose IC chip 25 storing a terminal-side value balance and can connect to an electronic money server 2 via the Internet 3. In the electronic money server 2, a server-side value balance corresponding to the portable terminal 5 is stored. The electronic money server 2 and the portable terminal 5 operate in cooperation with each other, and value can be transferred between the terminal-side value balance and the server-side value balance.

The portable terminal 5 displays a value transfer screen 41 by a user interface and can accept the amount (the unit amount and the number of units) of value to be transferred and the direction of transfer from the value transfer screen 41 by a user's touch operation.

In this way, the user can transfer an arbitrary amount of value between the terminal-side value balance and the server-side value balance with arbitrary timing by an intuitive and simple operation which is close to exchange of cash in terms of sense.

(2) Details of the Embodiment

First, an electronic money system 1 and the portable terminal 5 will be explained by using the drawings of FIG. 1.

FIG. 1(*a*) is a diagram for explaining the network configuration of the electronic money system 1 according to a first embodiment.

The electronic money system 1 is configured by using the electronic money server 2, the Internet 3, the portable terminal 5, a payment terminal 6, an asynchronous payment terminal 7, a virtual store server 51, and so forth.

The electronic money server 2 is a server that manages the transfer of money value by value. Here, value is electronic information (electronic value) related to money value, and the electronic money system 1 transfers the money value by increasing or decreasing the balance of value (hereinafter, a value balance).

In addition, a business entity of the electronic money system 1 relates the transfer of value to the transfer of actual money by transferring actual money in response to the transfer of value.

The electronic money server 2 stores a value balance in a state in which the value balance is related to the portable terminal 5. As will be described later, the portable terminal 5 stores a value balance also in the portable terminal 5, and, to distinguish between these value balances, the value balance stored on the side of the electronic money server 2 will be referred to as a server-side value balance and the value balance stored by the portable terminal 5 will be referred to as a terminal-side value balance.

As described above, in the electronic money system 1, a center management-type system based on the server-side value balance and a stored value-type system based on the terminal-side value balance coexist.

Thus, in the electronic money system 1, it is possible to make payment by using both the server-side value balance and the terminal-side value balance.

The portable terminal 5 is a portable terminal formed as, for example, a smartphone, a mobile telephone, a game console, a tablet computer, or the like and has the function of connecting to the Internet 3 and the function of connecting to the payment terminal 6 and the asynchronous payment terminal 7 by short-distance radio communication.

The portable terminal 5 incorporates the general-purpose IC chip 25 in advance and stores the terminal-side value balance therein. Incidentally, this general-purpose IC chip 25 can also be configured so as to be attached to the portable terminal 5, for example.

The portable terminal 5 can make both payment by using the server-side value balance and payment by using the terminal-side value balance, and, as to which balance is preferentially used in making payment, various forms are possible.

For example, there are cases where, for example, payment is made by using the server-side value balance and payment of an amount corresponding to a shortfall is made by using the terminal-side value balance, or, in an opposite manner, payment is made by using the terminal-side value balance and payment of an amount corresponding to a shortfall is made by using the server-side value balance.

Incidentally, as will be described later, since there is a need to make payment for the asynchronous payment terminal 7 by using the terminal-side value balance, it is desirable to make payment by preferentially using the server-side value balance and conserve the terminal-side value balance as much as possible.

Moreover, a configuration can also be adopted in which the user sets the order of priority of a balance used for payment with the portable terminal 5.

Furthermore, in the electronic money system 1, in addition to payment, the transfer of value can be performed bidirectionally between the server-side value balance and the terminal-side value balance; for example, the portable terminal 5 accesses the electronic money server 2 with arbitrary timing via the Internet 3 and transfers at least part of the server-side value balance to the terminal-side value balance or transfers at least part of the terminal-side value balance to the server-side value balance. This processing will be explained in detail later.

The payment terminal 6 is installed in an accounting counter, an automatic vending machine, or the like of a real store (a real store that is physically open in a real existing store or the like) such as a convenience store.

A communication line 8 is a line that connects the electronic money server 2 with the payment terminal 6. As the communication line 8, a dedicated line can be used, and a general-purpose line such as the Internet 3 may also be used.

The payment terminal 6 performs short-distance radio communication with the portable terminal 5 and performs communication also with the electronic money server 2 via the communication line 8, thereby sending information such as a payment amount to the electronic money server 2 and relaying the communication between the electronic money server 2 and the portable terminal 5. The payment terminal 6 is a synchronous payment terminal that performs online communication with the electronic money server 2 in real time at the time of payment using the portable terminal 5.

When payment is made by using the payment terminal 6 by using the server-side value balance, the following processing is performed.

The payment terminal 6 reads, from a subscriber information IC chip 21 of the portable terminal 5, a server-side electronic money number which is an account number of the server-side value balance via a short-distance communication controlling section 17 and sends the server-side electronic money number to the electronic money server 2 along with the payment amount.

The electronic money server 2 performs payment processing by reducing the payment amount from the server-side value balance identified by the server-side electronic money number.

Incidentally, without using the communication line 8, the portable terminal 5 may receive the payment amount from the payment terminal 6 and send the payment amount to the electronic money server 2 via the Internet 3 along with the server-side electronic money number stored in the portable terminal 5.

Moreover, when payment is made by using the payment terminal 6 by using the terminal-side value balance, the following processing is performed.

First, the payment terminal 6 sends the payment amount to the electronic money server 2. Next, the electronic money server 2 performs communication with the general-purpose IC chip 25 in the portable terminal 5 via the payment terminal 6, and sends thereto a command to reduce the terminal-side value balance by the payment amount and makes the general-purpose IC chip 25 perform payment processing.

Incidentally, without using the communication line 8, the portable terminal 5 may receive the payment amount from the payment terminal 6 and transmit the payment amount to the electronic money server 2 via the Internet 3, and a command may be sent to the portable terminal 5 from the electronic money server 2 via the Internet 3.

The asynchronous payment terminal 7 is installed in, for example, a store and an automatic vending machine with inconvenient network equipment and has the function of performing short-distance radio communication via the short-distance communication controlling section 17 of the portable terminal 5.

The asynchronous payment terminal 7 makes payment by using the terminal-side value balance by performing short-distance radio communication with the general-purpose IC chip 25 of the portable terminal 5 via the short-distance communication controlling section 17. The asynchronous payment terminal 7 is usually not connected to the electronic money server 2 (therefore cannot make real-time payment by using the server-side value balance) and temporarily stores the details of payment performed between the asynchronous payment terminal 7 and the portable terminal 5 as log data.

Then, the asynchronous payment terminal 7 connects to the electronic money server 2 around once a day, for example, by using the communication line 8 and sends the log data to the electronic money server 2. In an environment with no network communication equipment, a person in charge sometimes manually collects a recording medium on which the log data is recorded.

As for the terminal-side value balance, the electronic money server 2 manages the fund transfer based on the log data in the payment terminal 6 and the asynchronous payment terminal 7.

Incidentally, in an environment in which the portable terminal 5 can connect to the Internet 3, payment can be made between the general-purpose IC chip 25 and the electronic money server 2 via the portable terminal 5 as a result of the portable terminal 5 receiving the payment amount from the asynchronous payment terminal 7 and connecting the portable terminal 5 and the electronic money server 2 with the Internet 3.

The virtual store server 51 is a server of a virtual store that sells a product or service on the Internet 3.

The virtual store server 51 performs business transactions by accepting access from the portable terminal 5 via the Internet 3.

The virtual store server 51 asks the electronic money server 2 to make payment, and payment is made between the electronic money server 2 and the portable terminal 5 by using the Internet 3 as a medium.

More specifically, when accepting an offer to purchase a product from the portable terminal 5, the virtual store server 51 sends the payment amount to the electronic money server 2 and redirects connection from the portable terminal 5 to the electronic money server 2.

Then, the electronic money server 2 performs communication with the portable terminal 5 and performs payment processing of the payment amount by using the server-side value balance or the terminal-side value balance.

Figure 1B:
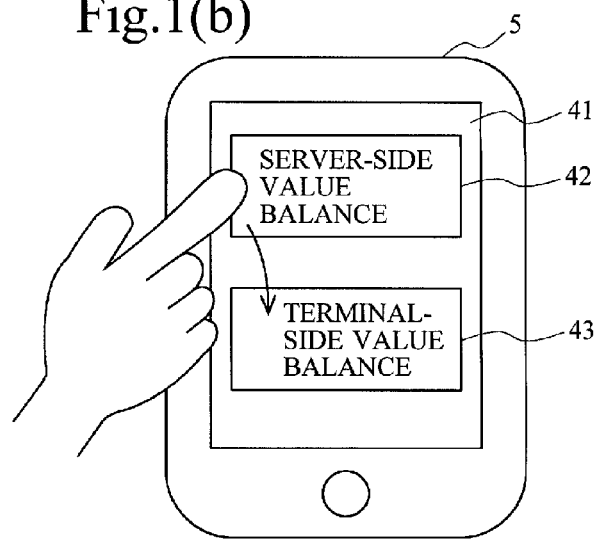

FIG. 1(b) is a diagram for explaining a user interface screen of the portable terminal 5.

The portable terminal 5 accepts a value transfer instruction from the user with the value transfer screen 41.

The value transfer screen 41 is configured such that, when the user touches it with the tip of a finger or a touch pen in accordance with the contents of display, the value transfer screen 41 accepts an input corresponding to the coordinate values of the touched spot.

As described above, in the portable terminal 5, by touching the value transfer screen 41, the user can designate the transfer amount (the unit amount and the number of units) of value and the direction of transfer (from the server-side value balance to the terminal-side value balance or from the terminal-side value balance to the server-side value balance).

In an example of the drawing, an instruction to transfer value from the server-side value balance to the terminal-side value balance is input by sliding the tip of a finger toward a terminal-side value balance region 43 in a state in which the tip of the finger touches a server-side value balance region 42.

There are various contents of display of the value transfer screen 41 and instruction input methods, which will be explained in detail later.

Figure 2:
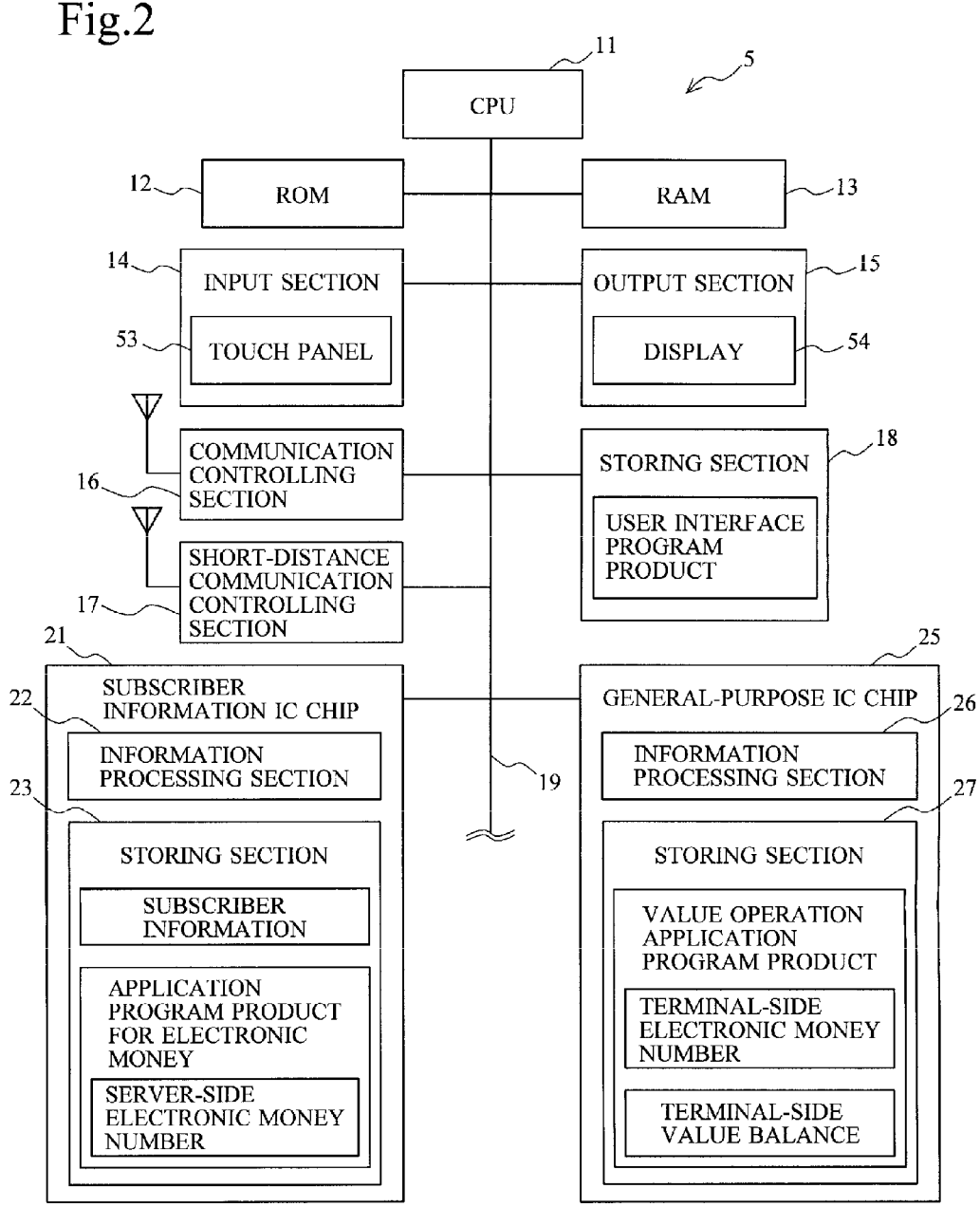
FIG. 2 is a diagram for explaining the configuration of the portable terminal.

FIG. 2 is a diagram depicting the hardware configuration of the portable terminal 5. Here, as an example, it is assumed that the portable terminal 5 is a smartphone, but the same goes for a mobile telephone and other portable terminals.

The portable terminal 5 is formed of a CPU (Central Processing Unit) 11, ROM (Read Only Memory) 12, RAM (Random Access Memory) 13, an input section 14, an output section 15, a communication controlling section 16, the short-distance communication controlling section 17, a storing section 18, the subscriber information IC chip 21, the general-purpose IC chip 25, and so forth which are connected to one another by a bus line 19.

The CPU 11 performs various kinds of information processing and overall control of the portable terminal 5 by executing a program product recorded on the ROM 12 and the storing section 18. In this embodiment, for example, by the function provided by an electronic money application program product which will be described later, the CPU 11 performs payment processing using the server-side value balance and the terminal-side value balance by cooperating with the electronic money server 2 and performs transfer of value between the server-side value balance and the terminal-side value balance.

The ROM 12 is read-only memory, and a basic program product used by the portable terminal 5 to operate, a parameter, data, and so forth are recorded thereon.

The RAM 13 is readable/writable memory and offers working memory used when the CPU 11 performs information processing.

The output section 15 is a functional section that outputs information to the user and is provided with a display 54 for screen display, a speaker from which sound is output, and so forth. The display 54 is formed as a liquid crystal display, for example, and the value transfer screen 41 (FIG. 1(b)) and objects such as various icons are displayed thereon.

The input section 14 is a functional section that inputs information from the outside and is provided with a touch panel 53 installed on the display 54, a microphone that inputs sound, a camera that takes an image of a subject, and so forth. By touching the touch panel 53 in response to the display on the display 54, the user can enter information corresponding to the object displayed in a region including a contact position (a user instruction position).

The storing section 18 is formed by using, for example, a recording medium such as an EEPROM (Electrically Erasable and Programmable ROM) and a hard disk, and an OS (Operating System) which is a basic program product that controls the portable terminal 5, a user interface program product that implements a user interface when transfer of value is performed, and other program products and data are recorded thereon.

The communication controlling section 16 includes an antenna for performing radio communication with a base station antenna of a mobile telephone network and connects the portable terminal 5 to the Internet 3 or a telephone line. The portable terminal 5 can perform communication with the virtual store server 51 and the electronic money server 2 through the communication controlling section 16 via the Internet 3.

The short-distance communication controlling section 17 includes an antenna for performing short-distance radio communication with reader/writers of the payment terminal 6 and the asynchronous payment terminal 7 and controls short-distance radio communication between the subscriber information IC chip 21 and the general-purpose IC chip 25 of the portable terminal 5 and the payment terminal 6 and the asynchronous payment terminal 7. In addition to performing communication with the payment terminal 6 and the asynchronous payment terminal 7 via the short-distance communication controlling section 17, the subscriber information IC chip 21 and the general-purpose IC chip 25 of the portable terminal 5 can perform communication with the electronic money server 2 via the payment terminal 6 and the communication line 8.

The subscriber information IC chip 21 is an IC chip that stores telephone subscriber information and is mounted on the portable terminal 5 as an IC card that can be attached to and detached from the portable terminal 5. This card is called a SIM (Subscriber Identity Module) card, for example.

The subscriber information IC chip 21 is formed of a CPU, RAM, ROM, and so forth and is provided with an information processing section 22 that performs information processing in accordance with various program products and a storing section 23 formed of nonvolatile memory.

In the storing section 23, subscriber information, an application program product for electronic money, and so forth are stored.

The telephone subscriber information includes ID information by which a telephone number is identified, and the portable terminal 5 to which the subscriber information IC chip 21 is attached becomes a functioning portable terminal by this telephone number.

The application program product for electronic money is a program product that supports payment and transfer by value, and, when this program product is executed by the CPU of the information processing section 22, an electronic money application by which the CPU, the CPU 11, and the CPU formed in the general-purpose IC chip 25 operate in cooperation is implemented.

The application program product for electronic money includes a server-side electronic money number. The server-side electronic money number is an account number of a value balance by which the server-side value balance that is used in payment processing and transfer processing is identified in the electronic money server 2.

As described above, since the subscriber information IC chip 21 stores the application program product for electronic money in addition to the subscriber information, when, for example, the user buys a new model to replace the portable terminal 5 with it, the user can continuously use the service by value in addition to the telephone number by the same server-side electronic money number by attaching the subscriber information IC chip 21 to the new portable terminal 5.

In addition to this, in the storing section 23, authentication data used by the electronic money server 2 to authenticate the subscriber information IC chip 21 can also be stored.

The general-purpose IC chip 25 is an IC chip that stores a general-purpose application and is mounted here on the portable terminal 5 as an IC card that can be attached to and detached from the portable terminal 5. The user can download an application and stores the application in the general-purpose IC chip 25.

The general-purpose IC chip 25 is formed of a CPU, RAM, ROM, and so forth and is provided with an information processing section 26 that performs information processing in accordance with various program products and a storing section 27 formed of nonvolatile memory.

In the storing section 27, a terminal-side electronic money number, the terminal-side value balance, a value operation application program product used by the information processing section 26 to operate the terminal-side value balance, the authentication data used by the electronic money server 2 to authenticate the general-purpose IC chip 25, and so forth are stored.

The terminal-side electronic money number is an account number used by the electronic money server 2 to identify the user of the terminal-side value balance.

Payment processing and increase processing related to the terminal-side value balance in the general-purpose IC chip 25 are performed by the value operation application program product formed in the information processing section 26 in the general-purpose IC chip 25 in accordance with an instruction from the outside in order to increase security by limiting processing of the terminal-side value balance to the inside of the general-purpose IC chip 25.

Incidentally, as for processing of the value balance, information to be input to the subscriber information IC chip 21 and the general-purpose IC chip 25 is encrypted and is decoded in the subscriber information IC chip 21 and the general-purpose IC chip 25, and the information to be output from the subscriber information IC chip 21 and the general-purpose IC chip 25 is output after being encrypted in these chips.

Figure 3:
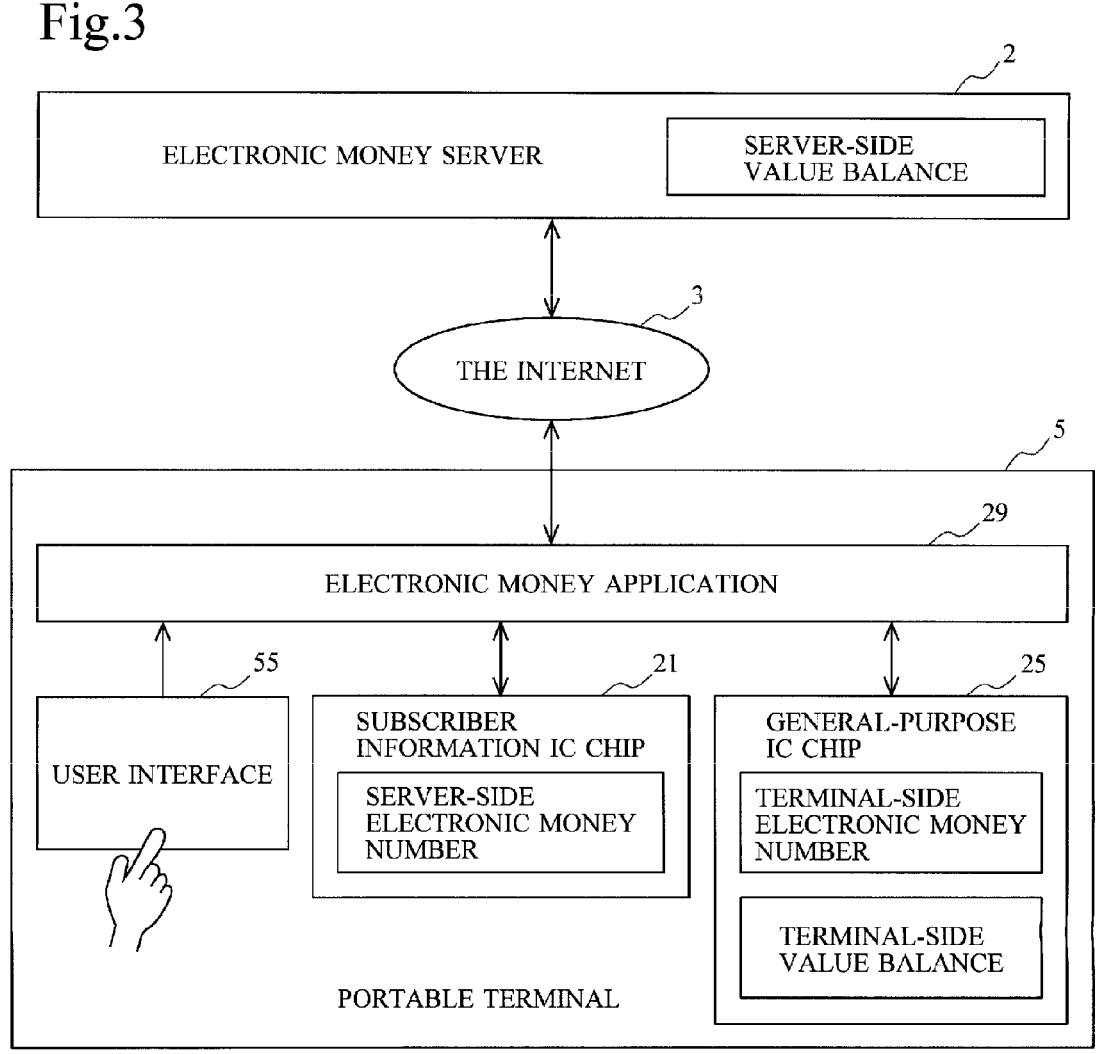
FIG. 3 is a diagram for explaining the function of the portable terminal.

FIG. 3 is a diagram for explaining the function of the portable terminal 5.

When the user interface program product is executed, a user interface 55 is formed; when the electronic money application program product is executed, an electronic money application 29 is formed in the portable terminal 5.

The electronic money application 29 displays the value transfer screen 41 or the like on the display 54. The user interface 55 detects a contact position (a user instruction position) on the touch panel 53. The user interface 55 sequentially notifies the electronic money application 29 of the position information indicating the detected contact position (user instruction position). The electronic money application 29 identifies the transfer amount (the product of the unit amount and the number of units) of value to be transferred and the direction of transfer based on the position information sequentially notified by the user interface 55.

Then, the electronic money application 29 performs the transfer of value based on the notified transfer amount and transfer direction while performing communication with the electronic money server 2, the subscriber information IC chip 21, and the general-purpose IC chip 25.

Figure 4:
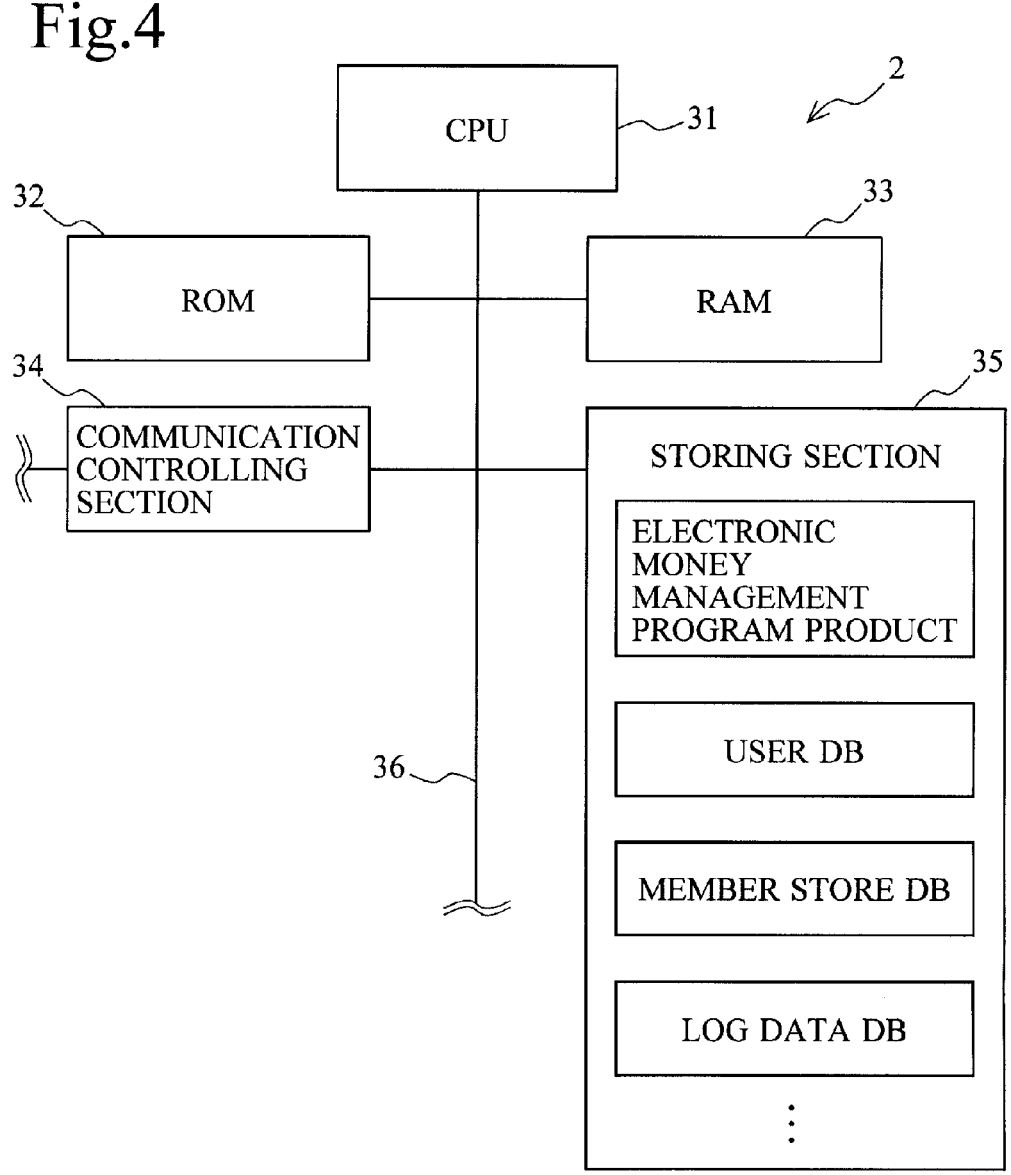
FIG. 4 is a diagram for explaining the configuration of an electronic money server.

FIG. 4 is a diagram for explaining the configuration of the electronic money server 2.

The electronic money server 2 is formed of a CPU 31, ROM 32, RAM 33, a communication controlling section 34, a storing section 35, and so forth which are connected to one another via a bus line 36.

The CPU 31 performs various kinds of information processing and overall control of the electronic money server 2 by executing the program product stored in the ROM 32 and the storing section 35.

In this embodiment, the CPU 31 performs payment processing by value by updating the server-side value balance and the terminal-side value balance in real time while performing communication with the payment terminal 6, the portable terminal 5, and the virtual store server 51 and updates the server-side value balance and the terminal-side value balance with the transfer of value which is performed between the server-side value balance and the terminal-side value balance.

The ROM 32 is read-only memory, and a basic program product used by the electronic money server 2 to operate, a parameter, data, and so forth are recorded thereon.

The RAM 33 is readable/writable memory and offers working memory used when the CPU 31 performs information processing.

With the communication controlling section 34, the electronic money server 2 performs communication with the payment terminal 6, the asynchronous payment terminal 7, and the portable terminal 5 via the communication line 8 and performs communication with the portable terminal 5 and the virtual store server 51 via the Internet 3.

The storing section 35 is formed of, for example, a large-capacity hard disk, and an electronic money management program product and other program products which are used by the CPU 31 to perform payment processing by value, a user DB (database) managing a user's server-side value balance and terminal-side value balance, a member store DB managing value payment performed in a member store, a log data DB storing log data of each payment processing, and so forth are recorded thereon.

Incidentally, in this embodiment, it is assumed that the electronic money server 2 includes these databases, but this is one example, and these databases may be placed in separate servers.

Next, by using the drawings of FIG. 5, the databases of the electronic money server 2 will be explained.

FIG. 5 is a diagram for explaining the logical configuration of the user DB.

In this embodiment, a user DB for the server-side electronic money number and a user DB for the terminal-side electronic money number are formed separately.

In the portable terminal 5, the subscriber information IC chip 21 and the general-purpose IC chip 25 are removable. Therefore, there is a possibility that the combination of the server-side value balance and the terminal-side value balance that are transferred in conjunction with each other is changed by replacement of these chips. Thus, the user DB for the server-side electronic money number and the user DB for the terminal-side electronic money number are formed separately, and correspondence between the balances to be transferred is established by mounting of the subscriber information IC chip 21 and the general-purpose IC chip 25 on the portable terminal 5.

The user DB for the server-side electronic money number is formed of "user ID", "server-side electronic money number", "server-side balance", and other items. For example, the authentication data for the subscriber information IC chip 21 can also be registered therein.

The item "user ID" is user identification information.

The item "server-side electronic money number" is an account number for distinguishing a server-side value balance from the server-side value balances of other users.

The item "server-side balance" is a server-side value balance of the account identified by the item "server-side electronic money number".

On the other hand, the user DB for the terminal-side electronic money number is formed of "user ID", "terminal-side electronic money number", and, though not depicted in the drawing, items such as authentication data for the general-purpose IC chip 25.

The item "user ID" is user identification information. This user ID does not have to be the same as the user ID in the user DB for the server-side electronic money number for one user.

The item "terminal-side electronic money number" is an account number for distinguishing a terminal-side value balance from the terminal-side value balances of other users.

In the above example, since the user DB for the server-side electronic money number and the user DB for the terminal-side electronic money number are formed independently, the combination of the server-side value balance and the terminal-side value balance which are to be transferred is defined by the combination of the subscriber information IC chip 21 and the general-purpose IC chip 25 that are physically mounted on the portable terminal 5.

Figure 6:
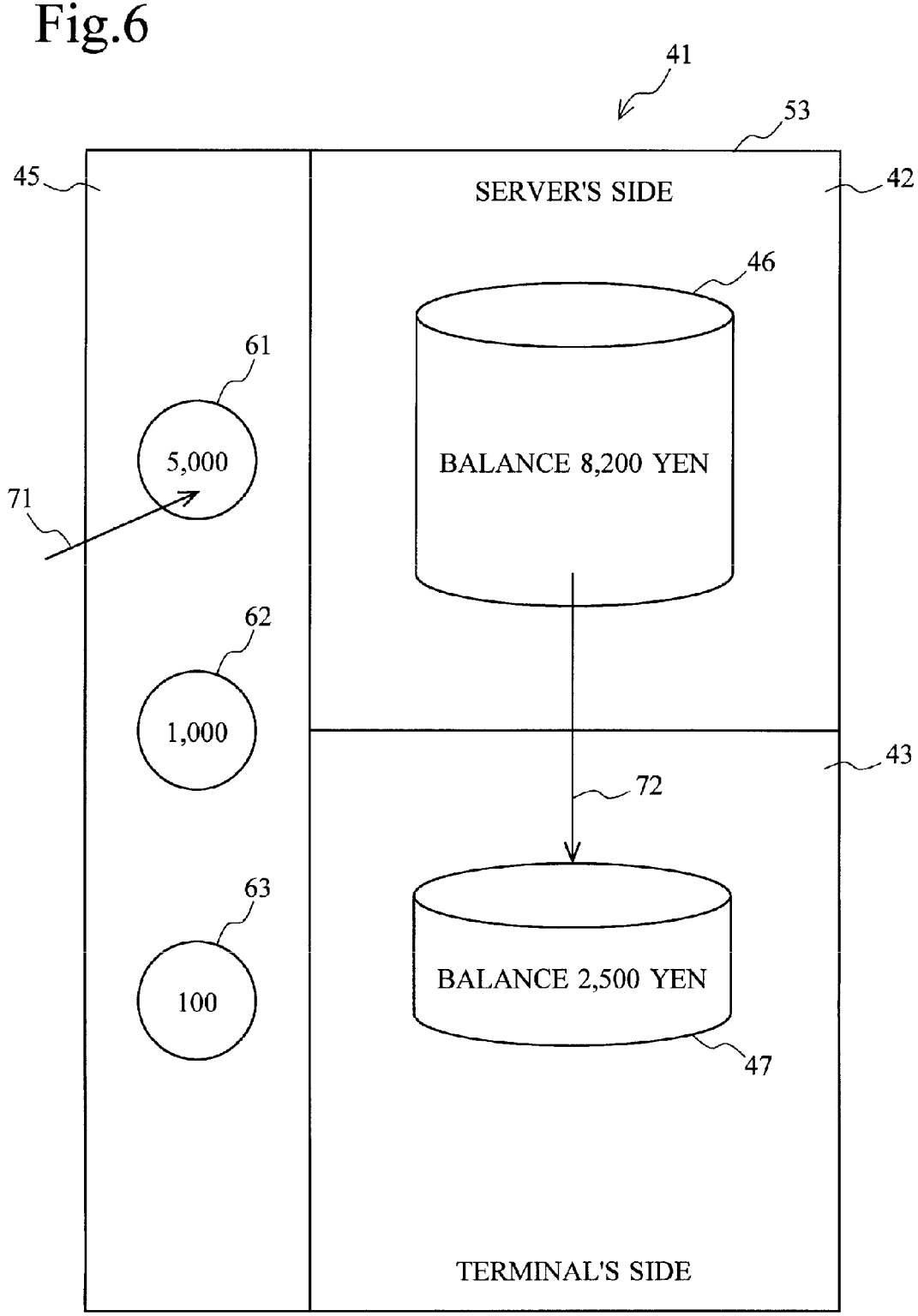
FIG. 6 is a diagram for explaining an example of a value transfer screen.

FIG. 6 is a diagram for explaining an example of the value transfer screen 41.

The value transfer screen 41 is provided by the electronic money application 29.

The value transfer screen 41 has a unit amount region 45 formed in an outer edge portion of the screen (a left region of the screen in FIG. 6), the server-side value balance region 42 formed in an upper-right region of the screen, and the terminal-side value balance region 43 formed in a lower-right region of the screen.

In the unit amount region 45, an icon 61 representing 5,000 yen, an icon 62 representing 1,000 yen, and an icon 63 representing 100 yen, each icon imitating a coin, are displayed. These icons 61 to 63 are objects for designating the unit of a transfer amount, and the user can designate the unit by touching a display region of any icon.

The amount represented by the icon displayed in this unit amount region 45 can be appropriately changed in accordance with the value balance in consideration of user-friendliness. For example, when the server-side value balance is 12,000 yen, there are an icon representing 10,000 yen, an icon representing 1,000 yen, and an icon representing 100 yen.

Moreover, an icon representing, as a unit amount, the amount obtained by predetermined numerical calculation (for example, subtraction, division) performed on the server-side value balance may be displayed in place of other icons or with other icons. For example, when the server-side value balance is 12,000 yen, icons representing, for example, 7,000 yen obtained by subtracting 5,000 yen therefrom and 6,000 yen obtained by dividing 12,000 by 2 may be displayed.

In the server-side value balance region 42, the server-side value balance is displayed as a balance display 46 imitating an image of stacked coins. This is displayed by the portable terminal 5 as a result of the portable terminal 5 having received the server-side value balance from the electronic money server 2.

The height of the coins is displayed in such a way that the more the amount of the server-side value balance, the higher the coins, which allows the user to grasp the balance intuitively. The balance display 46 is provided to notify the user of the balance and therefore cannot selected by the user even when the user touches the balance display 46.

In the terminal-side value balance region 43, the terminal-side value balance is displayed as a balance display 47 configured in the same manner as the balance display 46. This is displayed by the portable terminal 5 as a result of the portable terminal 5 having read the terminal-side value balance from the general-purpose IC chip 25. The balance display 47, too, cannot be selected by the user even when the user touches the balance display 47.

On the value transfer screen 41 configured as described above, input of the transfer amount (the unit amount and the number of units) and the direction of transfer is performed in the following manner.

The designation of the unit amount of the transfer amount is performed by the user by touching any one of the icons 61 to 63 with one finger.

Since the touch panel 53 is installed on the top face of the value transfer screen 41, when the user touches it with his/her finger, the portable terminal 5 can detect the coordinate values of the position touched by the finger (the user instruction position).

The portable terminal 5 determines whether or not the coordinate values of the position touched by the user are present in the region in which the icons 61 to 63 are displayed, and, if the portable terminal 5 determines that the coordinate values of the position touched by the user are present in the region, the portable terminal 5 determines that the icons 61 to 63 are selected by the user.

On the other hand, input of the number of units and the transfer direction of the transfer amount is performed by touching, in a state in which an icon of an intended unit amount of the icons 61 to 63 is being touched by a finger, one of the server-side value balance region 42 and the terminal-side value balance region 43, the one which is a source of transfer, and sliding it toward the other of the server-side value balance region 42 and the terminal-side value balance region 43, the one which is a destination of transfer.

For example, when value is transferred from the server-side value balance to the terminal-side value balance, after a finger is made to touch the server-side value balance region 42, the finger is slid to the terminal-side value balance region 43.

The portable terminal 5 samples the coordinate values of the position on the touch panel 53, the position touched by the finger, with a predetermined sampling period and can follow temporal changes in the coordinate values in real time.

Therefore, when the finger is moving while touching the touch panel 53, it is possible to determine that the finger is sliding on the value transfer screen 41.

The designation of the transfer amount and the transfer direction on the value transfer screen 41 is performed in this manner, and, for example, when, in a state in which one finger touches the icon 61 as indicated by an arrowed line 71, another finger is slid from the server-side value balance region 42 to the terminal-side value balance region 43 as indicated by an arrowed line 72, it is possible to transfer one unit of a unit amount 5,000 yen, that is, 5,000 yen from the server-side value balance to the terminal-side value balance.

The transfer of value is performed in real time between the electronic money server 2 and the portable terminal 5, and the displays of the balance display 46 and the balance display 47 are changed in real time in response thereto. The user simply has to repeat the above-described designation operation until an intended amount is transferred.

The above-described method for designating the transfer amount and the transfer direction is an example, and the following various modifications are possible.

(Modification 1-1 an Example in which the Operation to Designate the Transfer Direction is Modified)

An intended icon of the icons 61 to 63 is touched to designate the unit amount and is dragged and dropped to a destination region.

For example, when transfer of 1,000 yen from the terminal-side value balance to the server-side value balance is desired, the icon 62 is dragged and dropped to the server-side value balance region 42.

Here, drag is an operation by which an icon is touched and then the finger is slid on the touch panel 53, and drop is an operation by which the finger is slid and then it is moved away from the touch panel 53. Drag and drop is an operation by which drag is performed and then drop is performed.

The portable terminal 5 follows the movement trajectory of the tip of the finger by the touch panel 53, and, if the starting point of the trajectory is the icons 61 to 63, the portable terminal 5 determines that the selected icon is dropped at the endpoint of the trajectory.

(Modification 1-2 an Example in which the Operation to Designate the Transfer Direction is Modified)

An intended icon of the icons 61 to 63 is touched to designate the unit amount and the tip of a finger touching the icon is flicked toward a designation region.

For example, when 10,000 yen is transferred to the server-side value balance, a finger is made to touch the icon 61 and is flicked toward the server-side value balance region 42.

Here, flick is a flick operation, and the portable terminal 5 calculates the movement speed of the slide shift of the tip of the finger on the touch panel 53 and determines that it is a flick operation if the movement speed is more than or equal to a predetermined speed. Then, the portable terminal 5 determines whether the direction of the flick operation is the server-side value balance region 42 or the terminal-side value balance region 43 and accepts an instruction of the transfer direction based thereon.

(Modification 2-1 an Example in which an Operation to Designate the Number of Units is Incorporated into a Series of Operations to Designate the Unit Amount and the Transfer Direction)

After the icons 61 to 63 are tapped until the amount becomes an intended amount, the transfer direction is designated by another finger.

For example, when 2,000 yen is transferred from the server-side value balance to the terminal-side value balance, the icon 62 is tapped twice, and, in a state in which the icon 62 is being touched, the finger is slid from the server-side value balance region 42 to the terminal-side value balance region 43. Here, tap is an operation by which something is touched for a short time.

(Modification 2-2 An Example in Which an Operation to Designate the Number of Units is Incorporated Into a Series of Operations to Designate the Unit Amount and the Transfer Direction)

After the icons 61 to 63 are tapped until the amount becomes an intended amount, the transfer direction is designated.

For example, when 2,000 yen is transferred from the server-side value balance to the terminal-side value balance, the icon 62 is tapped twice, and the icon 62 is dragged and dropped to the terminal-side value balance region 43 or flicked toward the terminal-side value balance region 43.

(Modification 3-1 an Example in which the Repetition of a Series of Operations to Designate the Unit Amount and the Transfer Direction is Omitted)

The transfer direction is designated by using a plurality of fingers.

For example, when 2,000 yen is transferred to the server-side value balance, two fingers are slid from the terminal-side value balance region 43 to the server-side value balance region 42 in a state in which the fingers are touching the icon 62.

With Modification 3-1, when a plurality of units of value of one unit amount are transferred, there is no need to repeat a series of operations to designate the unit amount and the transfer direction.

(Modification 3-2 an Example in which the Repetition of a Series of Operations to Designate the Unit Amount and the Transfer Direction is Omitted)

A plurality of fingers are made to touch a plurality of icons 61 to 63, and the transfer direction is designated by using the remaining fingers.

For example, when transfer of 1,100 yen to the server-side value balance is desired, in a state in which two fingers are made to touch the icon 62 and the icon 63, another finger is slid from the terminal-side value balance region 43 to the server-side value balance region 42.

With Modification 3-2, when an intended number of units of each of a plurality of unit amounts is transferred, there is no need to repeat a series of operations to designate the unit amount and the transfer direction for each unit amount.

(Modification 4 an Example in which the Amount of Data which is Sent in Relation to a Transfer Request is Minimized)

In this embodiment and the above-described modified examples, the portable terminal 5 and the electronic money server 2 transfer value in real time every time the user performs a series of operations to designate the transfer amount (the unit amount) and the transfer direction on the value transfer screen 41. Instead, it is also possible to adopt a configuration in which the user temporarily sets the transfer of value on the value transfer screen 41 and the value is transferred collectively when the settings are completed.

In this case, the user sets an intended amount in an intended transfer direction on the value transfer screen 41. The actual transfer of value is performed when, for example, the user gives an instruction to perform execution by, for example, touching an execution icon or when the next operation is not performed for more than a predetermined time after the completion of a series of operations.

In this example, for example, when the user makes settings such that 3,000 yen is transferred to the server-side value balance and then makes settings such that 300 yen is transferred to the terminal-side value balance, the portable terminal 5 can operate in such a way that the portable terminal 5 transfers 2,700 yen to the server-side value balance by netting the transfer amounts in different transfer directions (by offset by performing addition thereof as negative values).

(Modification 5-1 an Example in which the Value Transfer Screen 41 is Displayed Automatically)

Moreover, a configuration in which the value transfer screen 41 is displayed automatically is also possible if necessary.

For example, a configuration is also possible in which the electronic money application 29 which is resident in the portable terminal 5 monitors the terminal-side value balance, and, if the terminal-side value balance becomes less than or equal to a previously set minimum balance (threshold value) or less than the previously set minimum balance (threshold value), the electronic money application 29 automatically displays the value transfer screen 41 and urges the user to perform the transfer of value from the server-side value balance.

Alternatively, the portable terminal 5 can be configured such that the portable terminal 5 monitors both the server-side value balance and the terminal-side value balance and, if at least one of the server-side value balance and the terminal-side value balance falls below a minimum balance, the portable terminal 5 automatically displays the value transfer screen 41 and urges the user to perform the transfer of value.

Since the portable terminal 5 incorporates the general-purpose IC chip 25, the portable terminal 5 can check the terminal-side value balance sequentially, and, as for the server-side value balance, the portable terminal 5 checks it when accessing the electronic money server 2, for example.

(Modification 5-2 an Example in which the Value Transfer Screen 41 is Displayed Automatically)

Moreover, a configuration is also possible in which, when the user enters a store in which only the asynchronous payment terminal 7 is present, if the balance is less than or equal to a previously set minimum balance (threshold value) or less than the previously set minimum balance (threshold value), the user interface 55 is started automatically to urge the user to perform the transfer of value from the server-side value balance.

In this case, as for sensing of entrance to the store, for example, an SSID (service set identifier) from a wireless LAN access point may be sensed by the antenna of the communication controlling section 16. Furthermore, a signal from a beacon may be sensed by the antenna of the communication controlling section 16. In addition, entrance to the store may be sensed by using the GPS function of the portable terminal 5.

Figure 7:
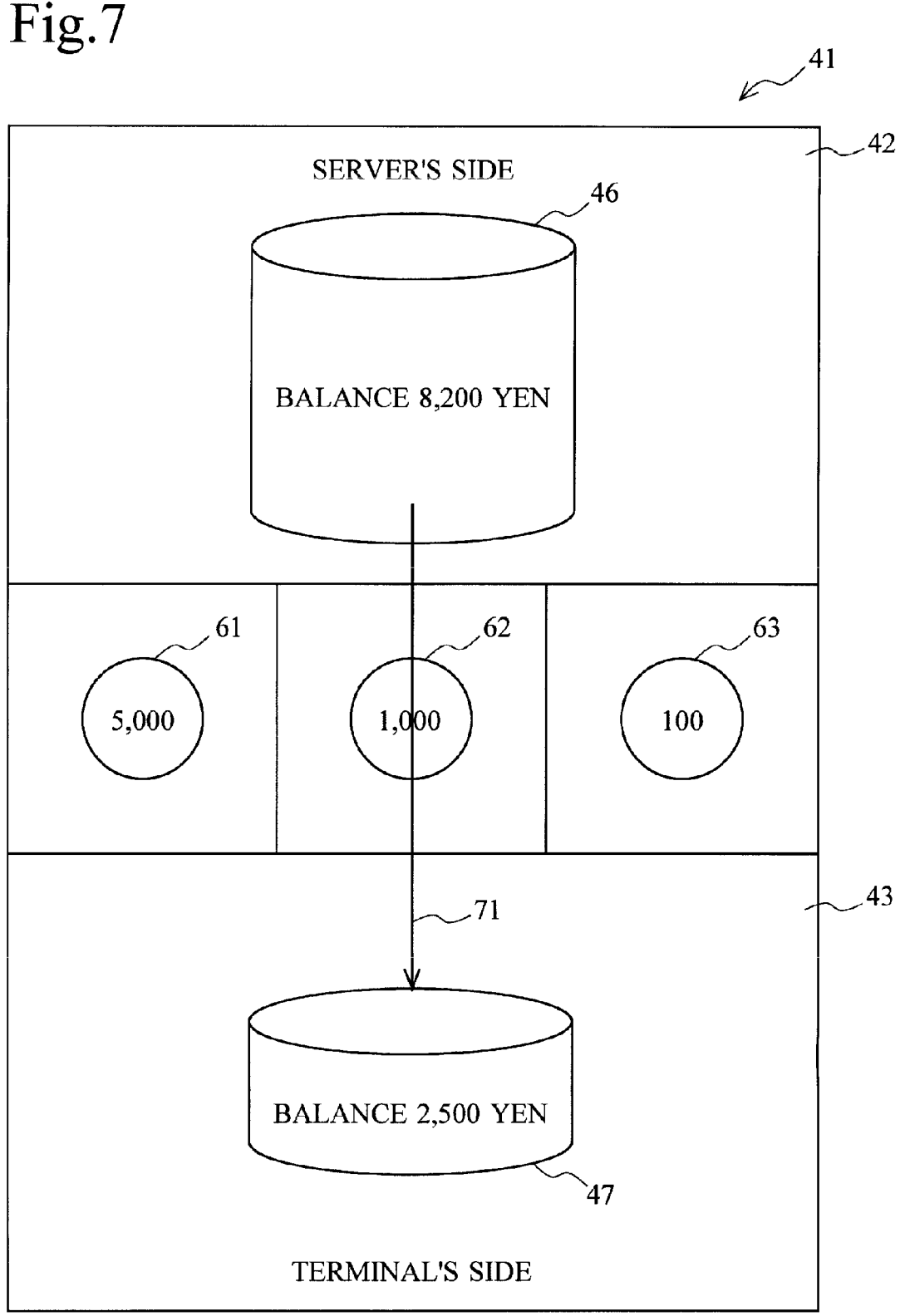
FIG. 7 is a diagram for explaining another example of the value transfer screen.

FIG. 7 is a diagram for explaining another example of the value transfer screen 41.

In this example, the server-side value balance region 42 is displayed on the upper side of the value transfer screen 41, the terminal-side value balance region 43 is displayed on the lower side, and the icons 61 to 63 are displayed between them (in a region overlapping the boundary line between the two regions).

On the value transfer screen 41 of this example, the user slides a finger from a transfer source region to a transfer destination region via the icon indicating the unit amount.

For example, when the user desires to transfer 1,000 yen from the server-side value balance to the terminal-side value balance, as indicated by an arrowed line 71, the user touches the server-side value balance region 42 and then slides a finger to the terminal-side value balance region 43 via the icon 62. The user repeats this operation until an intended amount is transferred.

Moreover, it is also possible to slide one finger and another finger at the same time and thereby transfer the total amount of the amount of the icon via which the one finger was slid and the amount of the icon via which the other finger was slid.

For example, if one finger and another finger are slid from the server-side value balance region 42 to the terminal-side value balance region 43 at the same time and the one finger was slid via the icon 62 and the other finger was slid via the icon 63, 1,100 yen is transferred from the server-side value balance to the terminal-side value balance. Moreover, if the two fingers were slid via the icon 62, 2,000 yen is transferred.

Also in this example, various modifications are possible.

For example, a configuration is also possible in which, after an icon of an intended amount is tapped, an intended transfer destination is tapped, or an icon of an intended amount is dragged and dropped to an intended transfer destination.

Figure 8:
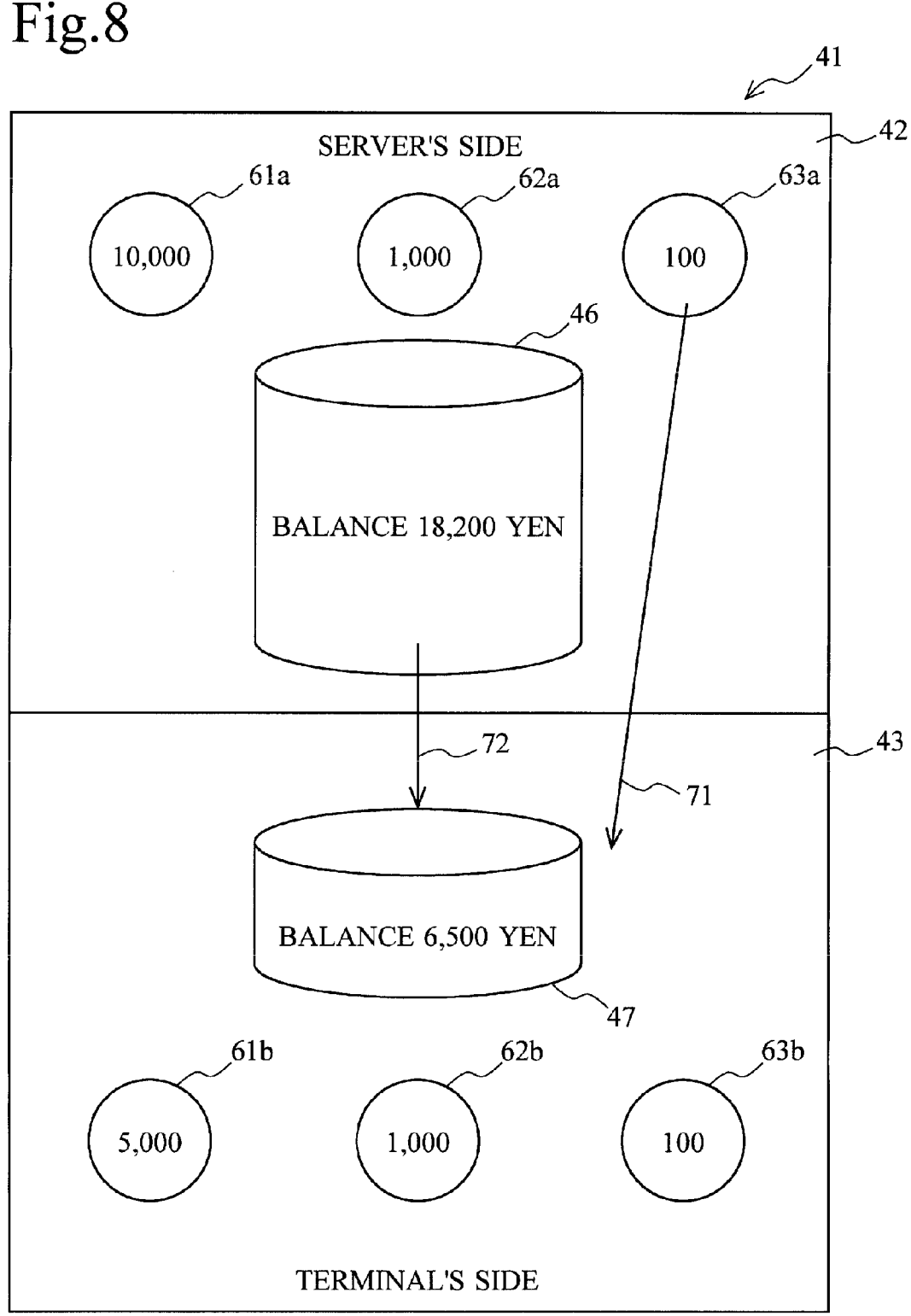
FIG. 8 is a diagram for explaining another example of the value transfer screen.

FIG. 8 is a diagram for explaining another example of the value transfer screen 41.

In this example, the server-side value balance region 42 is displayed on the upper side of the value transfer screen 41, and the terminal-side value balance region 43 is displayed on the lower side.

Then, in the server-side value balance region 42, icons 61*a* to 63*a* are displayed, and, in the terminal-side value balance region 43, icons 61*b* to 63*b* are displayed.

In the value transfer screen 41 of this example, the user touches an icon of an intended amount in a transfer source region and drags and drops the icon to a transfer destination region.

For example, when the transfer of 100 yen from the server-side value balance to the terminal-side value balance is desired, as indicated by an arrowed line 71, the icon 63*a* is dragged and dropped to the terminal-side value balance region 43.

Also in this example depicted in FIG. 8, various modifications are possible. For example, the amount indicated by a displayed icon can be changed appropriately in accordance with the value balance in consideration of user-friendliness.

Moreover, in the example of FIG. 8, the server's side and the terminal's side are displayed on the upper and lower sides, but the server's side and the terminal's side may be displayed on the right and left sides.

Figure 9:
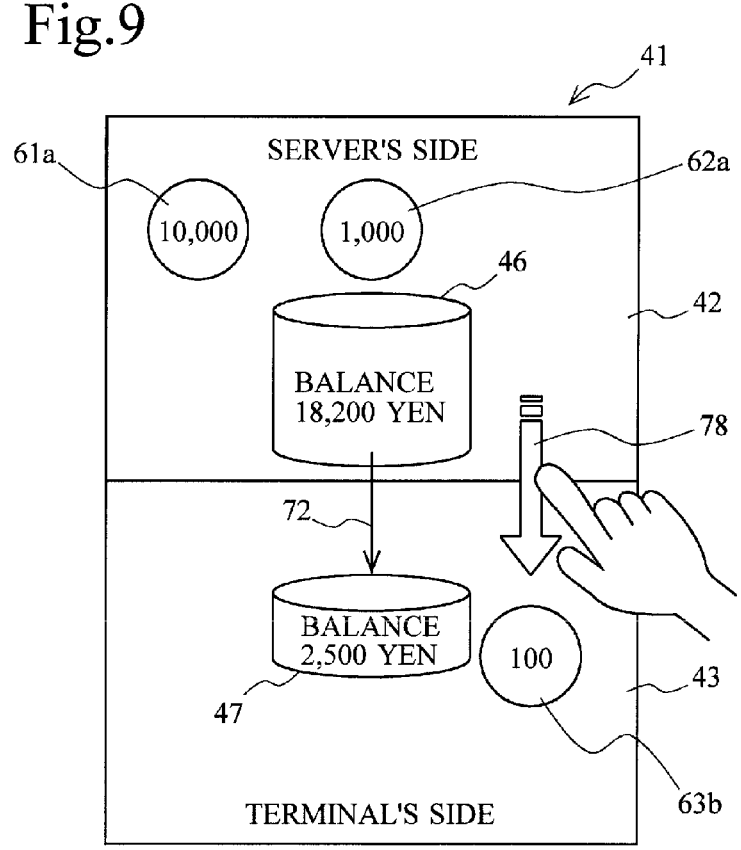
FIG. 9 is a diagram for explaining another example of the value transfer screen.
Figure 9:
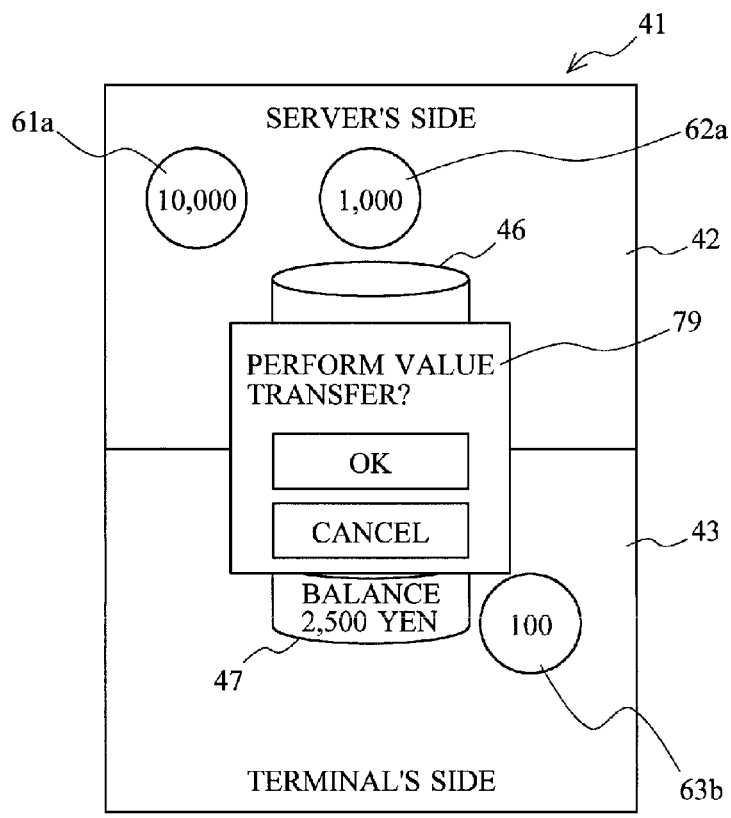

FIGS. 9(*a*) and (*b*) are diagrams for explaining an example in which the transfer of value is actually performed in the example of the value transfer screen 41 of FIG. 8.

In the example described here, the icon 63*b* (100 yen) in the server-side value balance region 42 is moved to the terminal's side by dragging and dropping it with a finger of the user. When movement is performed, a movement arrow 78 is displayed, which allows the user to realize that the user is actually moving the icon.

When the movement operation is finished, as depicted in (b), a pop-up (a window) 79 is displayed to urge the user to determine whether the transfer of value is performed or not.

Incidentally, the icon displayed in the server-side value balance region 42 may be changed in accordance with the value balance. For example, if the value balance is 12000, 10000, 1000, and 100 are displayed; if the value balance is 9000, 5000, 3000, and 100 are displayed.

Next, by using FIGS. 10 to 12, the procedure of value transfer processing which is performed by the portable terminal 5 and the electronic money server 2 will be explained.

In this processing, with the transfer of value, in the value transfer source, the balance is reduced by the transfer amount; in the value transfer destination, the value is increased by the transferred value.

In this embodiment, a reduction in the value transfer source is first performed and then an increase in the value transfer destination is performed.

This is because, if a failure occurs during the processing and recovery is performed later, recovery by which the value is increased gives the user less stress than recovery by which the value is reduced.

Figure 10:
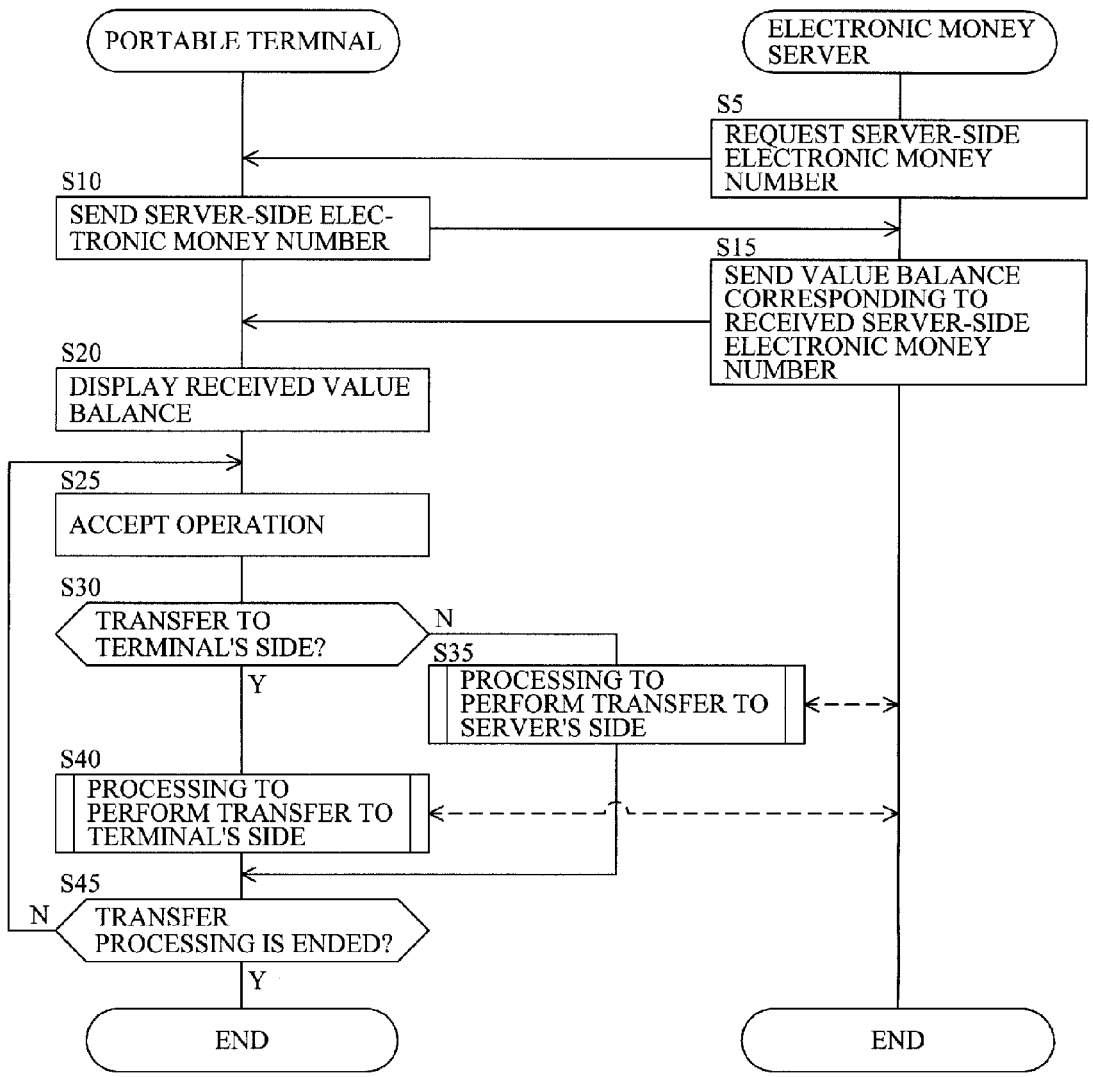
FIG. 10 is a flowchart for explaining the procedure of value transfer processing.

FIG. 10 is a flowchart for explaining the procedure of the value transfer processing.

The following processing is performed by the CPU 11 of the portable terminal 5, the CPU of the information processing section 22, the CPU of the information processing section 26, and the CPU 31 of the electronic money server 2 in accordance with a predetermined program product.

First, the user starts the electronic money application 29 by, for example, touching an icon that starts value transfer processing.

Then, the value transfer screen 41 is displayed on the display 54. At this time, the electronic money application 29 acquires the terminal-side balance from the general-purpose IC chip 25 and displays the contents in accordance with the acquired balance in the terminal-side value balance region.

Incidentally, at the time of these start-ups, personal authentication may be performed on the user by, for example, asking the user to enter a password or a fingerprint.

When the electronic money application 29 is started, the portable terminal 5 accesses the electronic money server 2.

Then, the electronic money server 2 performs polling on the subscriber information IC chip 21 via the portable terminal 5. This polling is processing performed to check (capture) the presence of the subscriber information IC chip 21 which is the other party with which value processing is performed.

When receiving the polling from the electronic money server 2 via the portable terminal 5, the subscriber information IC chip 21 returns a response to the electronic money server 2 via the portable terminal 5. This response is given by, for example, sending back the ID information of the subscriber information IC chip 21.

A configuration is also possible in which the electronic money server 2 then requests the authentication data from the subscriber information IC chip 21 of the portable terminal 5 and authenticates the subscriber information IC chip 21.

When receiving the response from the subscriber information IC chip 21 via the portable terminal 5, the electronic money server 2 requests the server-side electronic money number from the subscriber information IC chip 21 via the portable terminal 5 (step 5).

When receiving this request from the electronic money server 2 via the portable terminal 5, the subscriber information IC chip 21 reads the server-side electronic money number from the storing section 23 and sends the server-side electronic money number to the electronic money server 2 (step 10).

Based on this server-side electronic money number, the electronic money server 2 identifies the server-side electronic money number on which transfer of value is performed.

Incidentally, the server-side electronic money number may be read from the subscriber information IC chip 21 at the time of startup of the electronic money application 29, and the server-side electronic money number may be sent as the portable terminal 5 accesses the electronic money server 2. In this case, the electronic money application 29 sends out a command to the subscriber information IC chip 21 and acquires the server-side electronic money number as a response.

The electronic money server 2 reads the value balance corresponding to the identified server-side electronic money number and sends the value balance to the portable terminal 5 (step 15). The portable terminal 5 displays the server-side balance in the server-side value balance region 42 of the value transfer screen 41 (step 20) and performs display in accordance with the balance.

Next, the portable terminal 5 accepts the operation performed by the user on the value transfer screen 41 (step 25).

As a result, the portable terminal 5 acquires the transfer amount (the unit amount and the number of units) of value and the transfer direction.

Next, the portable terminal 5 determines the transfer direction of value.

If value is transferred from the terminal-side value balance to the server-side value balance (step 30; N), the portable terminal 5 performs processing to perform transfer to the server's side with the electronic money server 2 (step 35).

If value is transferred from the server-side value balance to the terminal-side value balance (step 30; Y), the portable terminal 5 performs processing to perform transfer to the terminal's side with the electronic money server 2 (step 40).

Next, the portable terminal 5 determines whether or not the value transfer processing is ended (step 45).

This determination is made based on an instruction from the user, such as an instruction given by the user by touching an end icon on the value transfer screen 41.

Figure 11:
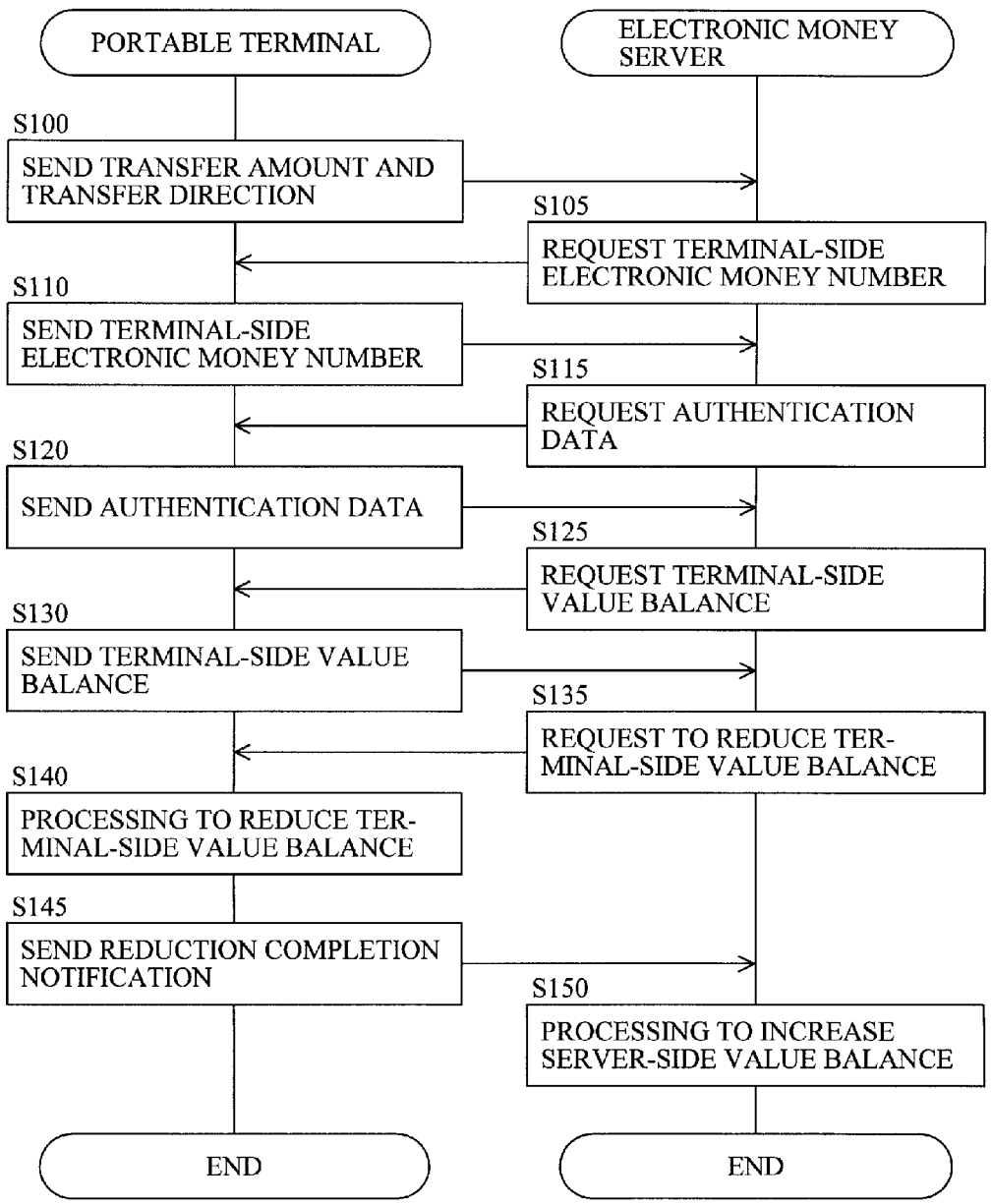
FIG. 11 is a flowchart for explaining processing to perform transfer to the server's side.

FIG. 11 is a flowchart for explaining processing to perform transfer to the server's side in step 35.

The portable terminal 5 sends the transfer amount and the transfer direction to the electronic money server 2 (step 100). In this case, the transfer direction is a direction from the terminal-side value balance to the server-side value balance.

When receiving these information, the electronic money server 2 performs polling on the general-purpose IC chip 25 via the portable terminal 5. This polling is processing performed to check (capture) the presence of the other party (the general-purpose IC chip 25) in the transfer source.

When receiving the polling from the electronic money server 2 via the portable terminal 5, the general-purpose IC chip 25 returns a response to the electronic money server 2. This response is given by, for example, sending back the ID information of the general-purpose IC chip 25.

When receiving the response from the general-purpose IC chip 25 via the portable terminal 5, the electronic money server 2 requests the terminal-side electronic money number from the general-purpose IC chip 25 via the portable terminal 5 (step 105).

When receiving the request for the terminal-side electronic money number from the electronic money server 2 via the portable terminal 5, the general-purpose IC chip 25 reads the terminal-side electronic money number from the storing section 27 and sends the terminal-side electronic money number to the electronic money server 2 via the portable terminal 5 (step 110).

When receiving the terminal-side electronic money number from the general-purpose IC chip 25 via the portable terminal 5, the electronic money server 2 requests authentication data from the general-purpose IC chip 25 via the portable terminal 5 (step 115).

When receiving the request for authentication data from the electronic money server 2 via the portable terminal 5, the general-purpose IC chip 25 reads the authentication data from the storing section 27 and sends the authentication data to the electronic money server 2 via the portable terminal 5 (step 120).

When receiving the authentication data from the general-purpose IC chip 25 via the portable terminal 5, the electronic money server 2 authenticates the general-purpose IC chip 25 by using the authentication data.

When authentication is successfully performed, the electronic money server 2 requests the terminal-side value balance from the general-purpose IC chip 25 via the portable terminal 5 (step 125).

When receiving the request for the terminal-side value balance from the electronic money server 2 via the portable terminal 5, the general-purpose IC chip 25 reads the terminal-side value balance from the storing section 27 and sends the terminal-side value balance to the electronic money server 2 via the portable terminal 5 (step 130).

When receiving the terminal-side value balance from the general-purpose IC chip 25 via the portable terminal 5, the electronic money server 2 determines whether or not the terminal-side value balance is enough to cover the amount to be transferred.

If the terminal-side value balance is not enough, the electronic money server 2 sends an error notification to the portable terminal 5 and stops the transfer processing.

If the terminal-side value balance is enough to cover the amount to be transferred, the electronic money server 2 sends a reduction request to the general-purpose IC chip 25 via the portable terminal 5 so as to reduce the current terminal-side value balance by the transfer amount (step 135).

When receiving the reduction request from the electronic money server 2 via the portable terminal 5, the general-purpose IC chip 25 executes this request by the information processing section 26 and updates the terminal-side value balance to a value obtained by reducing the terminal-side value balance by the transfer amount (step 140).

As described above, the general-purpose IC chip 25 increases security by reducing the terminal-side value balance by executing the request from the electronic money server 2 by the information processing section 26. That is, the function of updating the terminal-side value balance is limited to the inside of the electronic money server 2 and the general-purpose IC chip 25, whereby an unauthorized operation such as an unauthorized increase of value is prevented.

Moreover, as the value balance update processing that is performed here, the following methods are possible.

(Method 1) A case where an overwriting instruction is sent as a value balance update request.

In this case, the electronic money server 2 subtracts a transfer amount from the terminal-side value balance received from the general-purpose IC chip 25 and calculates the balance after subtraction. Then, the electronic money server 2 sends, as a terminal-side value balance update request, an overwriting instruction by which overwriting is performed on the balance after calculation. The general-purpose IC chip 25 performs update by performing overwriting with the terminal-side value balance in accordance with the overwriting instruction.

(Method 2) A case where a subtraction instruction is sent as the value balance update request.

In this case, the electronic money server 2 sends a subtraction instruction by which a transfer amount is subtracted from the terminal-side value balance to the general-purpose IC chip 25 as the terminal-side value balance update request. The general-purpose IC chip 25 updates the terminal-side value balance by subtracting the transfer amount from the terminal-side value balance in accordance with the instruction.

The above methods 1 and 2 describe cases where the terminal-side value balance is reduced, but the methods 1 and 2 can also be applied to a case where the terminal-side value balance is increased.

After updating the terminal-side value balance in this manner, the general-purpose IC chip 25 sends a reduction completion notification to the electronic money server 2 (step 145).

When receiving the reduction completion notification from the general-purpose IC chip 25 via the portable terminal 5, the electronic money server 2 increases, by the transfer amount, the server-side value balance of an account identified by the server-side electronic money number received in step 10 (FIG. 10) (step 150). Thereafter, the electronic money server 2 notifies the portable terminal 5 of the completion of value transfer processing. The portable terminal 5 performs display informing that the transfer of value is completed.

In the manner described above, value is transferred from the terminal-side value balance to the server-side value balance.

Moreover, since the server-side value balance is increased after the terminal-side value balance is reduced, if a failure occurs in processing to reduce the terminal-side value balance, recovery processing by which the terminal-side value balance is increased is performed. Since the recovery processing is processing to increase the balance, it is possible to reduce psychological stress on the user.

Figure 12:
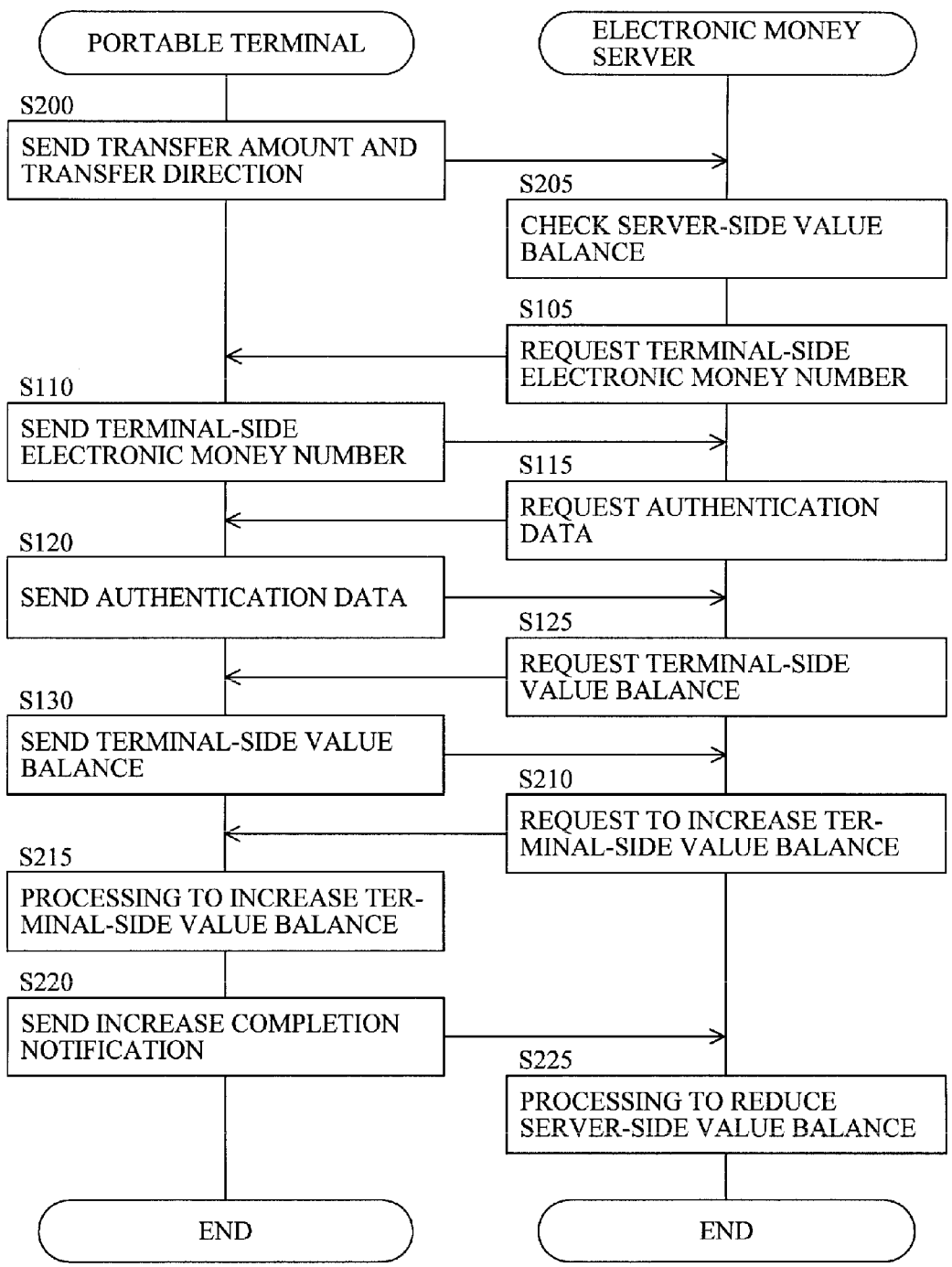
FIG. 12 is a flowchart for explaining processing to perform transfer to the terminal's side.

FIG. 12 is a flowchart for explaining processing to perform transfer to the terminal's side in step 40. The same step number is attached to the same processing of FIG. 11 and the explanation thereof is omitted.

The portable terminal 5 sends the transfer amount and the transfer direction to the electronic money server 2 (step 200). In this case, the transfer direction is a direction from the server-side value balance to the terminal-side value balance.

When receiving these information, the electronic money server 2 checks the server-side value balance of an account identified by the server-side electronic money number received in step 10 (FIG. 10) (step 205). Incidentally, if the server-side value balance is more than or equal to the transfer amount, the electronic money server 2 may temporarily lock an amount of the server-side value balance, the amount corresponding to the transfer amount. On the other hand, if the server-side value balance is not enough to cover the transfer amount, the electronic money server 2 sends an error message to the portable terminal 5 and ends the processing.

Hereinafter, steps 105 to 130 are the same as those of FIG. 11.

Next, when receiving the terminal-side value balance from the general-purpose IC chip 25 via the portable terminal 5, the electronic money server 2 sends an increase request to the general-purpose IC chip 25 via the portable terminal 5 so as to increase the current terminal-side value balance by the transfer amount (step 210).

When accepting the increase request from the electronic money server 2 via the portable terminal 5, the general-purpose IC chip 25 executes this request by the information processing section 26 and updates the terminal-side value balance to a value obtained by increasing the terminal-side value balance by the transfer amount (step 215).

Then, the general-purpose IC chip 25 sends an increase completion notification to the electronic money server 2 via the portable terminal 5 (step 220).

When receiving the increase completion notification from the general-purpose IC chip 25 via the portable terminal 5, the electronic money server 2 performs server-side value balance reduction processing (step 225). Thereafter, the electronic money server 2 notifies the portable terminal 5 of the completion of the value transfer processing. The portable terminal 5 performs display informing that the transfer of value is completed.

In the manner described above, value is transferred from the server-side value balance to the terminal-side value balance.

While this embodiment has been described above, various modifications are possible.

For example, in this embodiment, transfer of value is performed between the server-side value balance and the terminal-side value balance which belong to the same user, but a configuration is also possible in which value is transferred between the balances belonging to different users.

For example, the usage that transfers an allowance from the server-side value balance of parents to the terminal-side value balance of a child is possible.

Moreover, for example, it is possible to use the terminal-side value balance to make payment for the virtual store server 51.

In this case, the server-side value balance region 42 of the value transfer screen 41 serves as a region of the virtual store server 51, and it is possible to make payment by transferring value from the terminal-side value balance to the region of the virtual store server 51.

Figure 13:
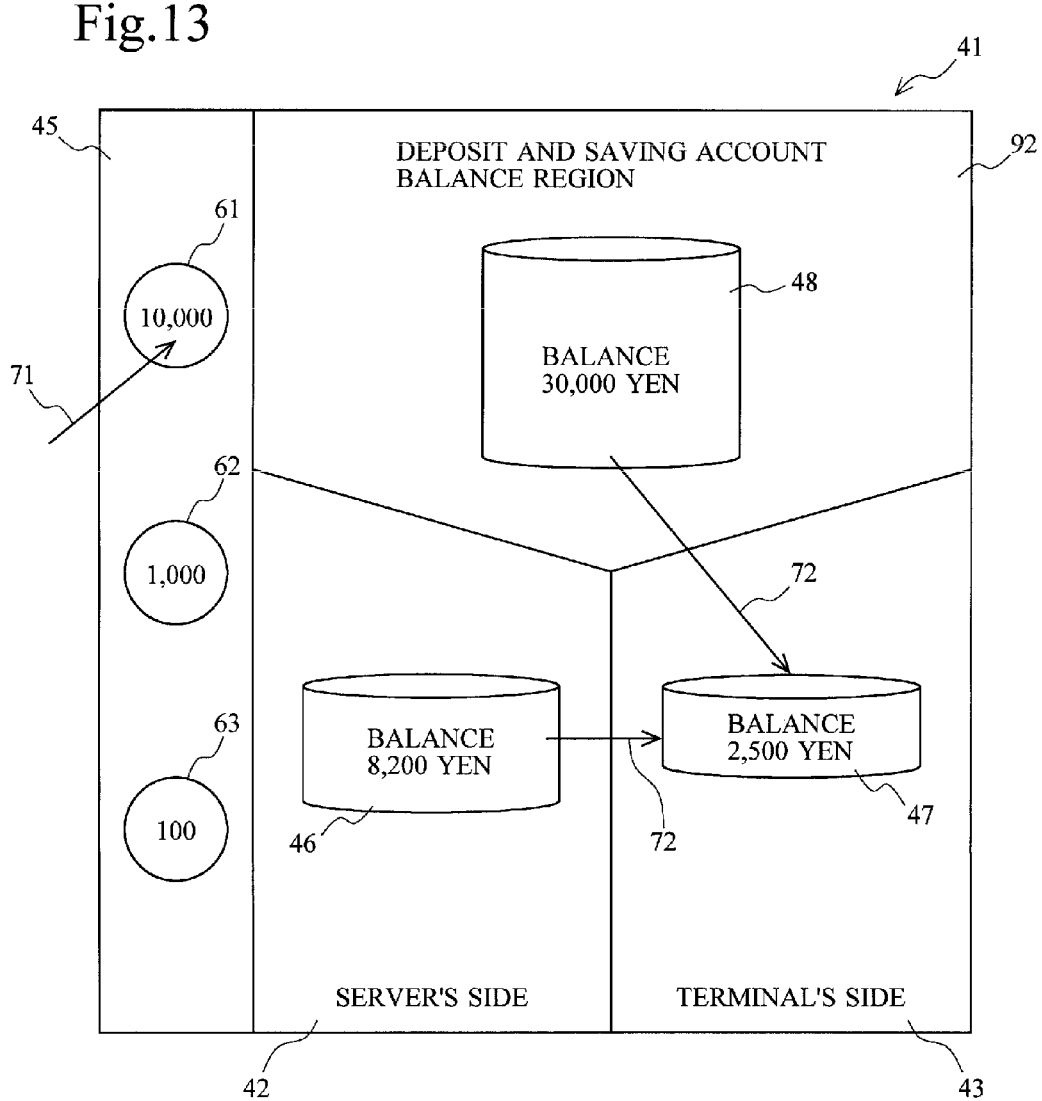
FIG. 13 is a diagram for explaining another example of the value transfer screen.

FIG. 13 is a diagram for explaining another example of the value transfer screen 41.

As is the case with the example depicted in FIG. 6, the value transfer screen 41 is provided by the electronic money application 29.

The value transfer screen 41 has a unit amount region 45 formed in a left region of the screen, a server-side value balance region 42 formed in a lower-left region of the screen, a terminal-side value balance region 43 formed in a lower-right region of the screen, and a deposit and saving account balance region 92 formed at the top of the screen.

In the unit amount region 45, as is the case with the example depicted n FIG. 6, a plurality of icons 61 to 63 are displayed. These icons 61 to 63 are objects for designating the unit of a transfer amount, and the user can designate the unit by touching a display region of any icon.

In the server-side value balance region 42, the server-side value balance is displayed as a balance display 46. This is displayed by the portable terminal 5 as a result of the portable terminal 5 having received the server-side value balance from the electronic money server 2.

On the other hand, in the terminal-side value balance region 43, the terminal-side value balance is displayed as a balance display 47. This is displayed by the portable terminal 5 as a result of the portable terminal 5 having read the terminal-side value balance from the general-purpose IC chip 25.

Furthermore, in this example, the deposit and saving account balance region 92 is provided. In this region, a display 48 of the deposit balance of a bank account or the like of the user is displayed. Moreover, for example, the balance of credit of the current period (for example, this month) of a credit card may be displayed.

The display 48 of the deposit balance of a bank account or the like, the display 48 displayed in this deposit and saving account balance region 92, displays the balance of a bank account or the like related to the server-side electronic money number in advance in the electronic money server 2. This processing is predicated on the completion of a contract with the user to make a withdrawal, when the electronic money server 2 performs recharging of electronic money from the balance of a bank account or the like of the user, from the account.

This deposit balance of a bank account or the like is sent, at the same time the electronic money server 2 reads the value balance corresponding to the identified server-side electronic money number and sends the value balance to the portable terminal 5, displays the server-side balance in the server-side value balance region 42 of the portable terminal 5, and, at the same time, displays the deposit balance of a bank account or the like in the deposit and saving account balance region 92 (refer to step 15 and step 20 of FIG. 10).

Input of the transfer amount (the unit amount and the number of units) and the transfer direction on the value transfer screen 41 in this example depicted in FIG. 13 is performed in a manner similar to the example depicted in FIG. 6.

In this example depicted in FIG. 13, it is possible to transfer (recharge) value from a deposit account of a bank or the like directly to the terminal's side.

Figure 14:
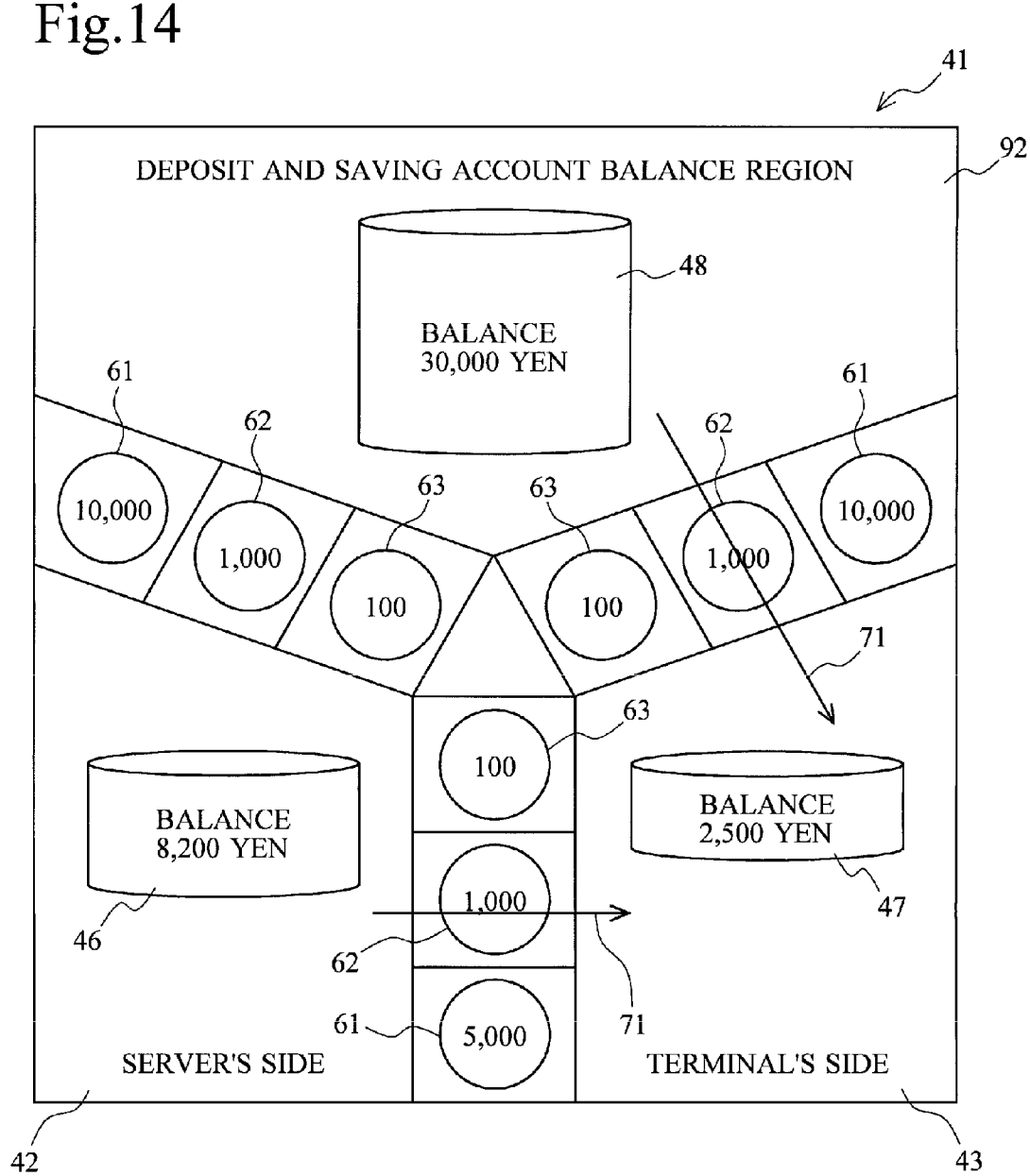
FIG. 14 is a diagram for explaining another example of the value transfer screen.

In FIG. 14, an example in which the deposit and saving account balance region 92 is provided in the example depicted in FIG. 7 is depicted.

In this example depicted in FIG. 14, as is the case with the example depicted in FIG. 13, it is possible to transfer (recharge) value from a deposit account of a bank or the like directly to the terminal's side.

Input of the transfer amount (the unit amount and the number of units) and the transfer direction on the value transfer screen 41 in this example depicted in FIG. 14 is performed in a manner similar to the example depicted in FIG. 7.

Moreover, the processing to display the display 48 of the deposit balance of a bank account or the like in the deposit and saving account balance region 92 of the portable terminal 5 is similar to that of the example depicted in FIG. 13.

Figure 15:
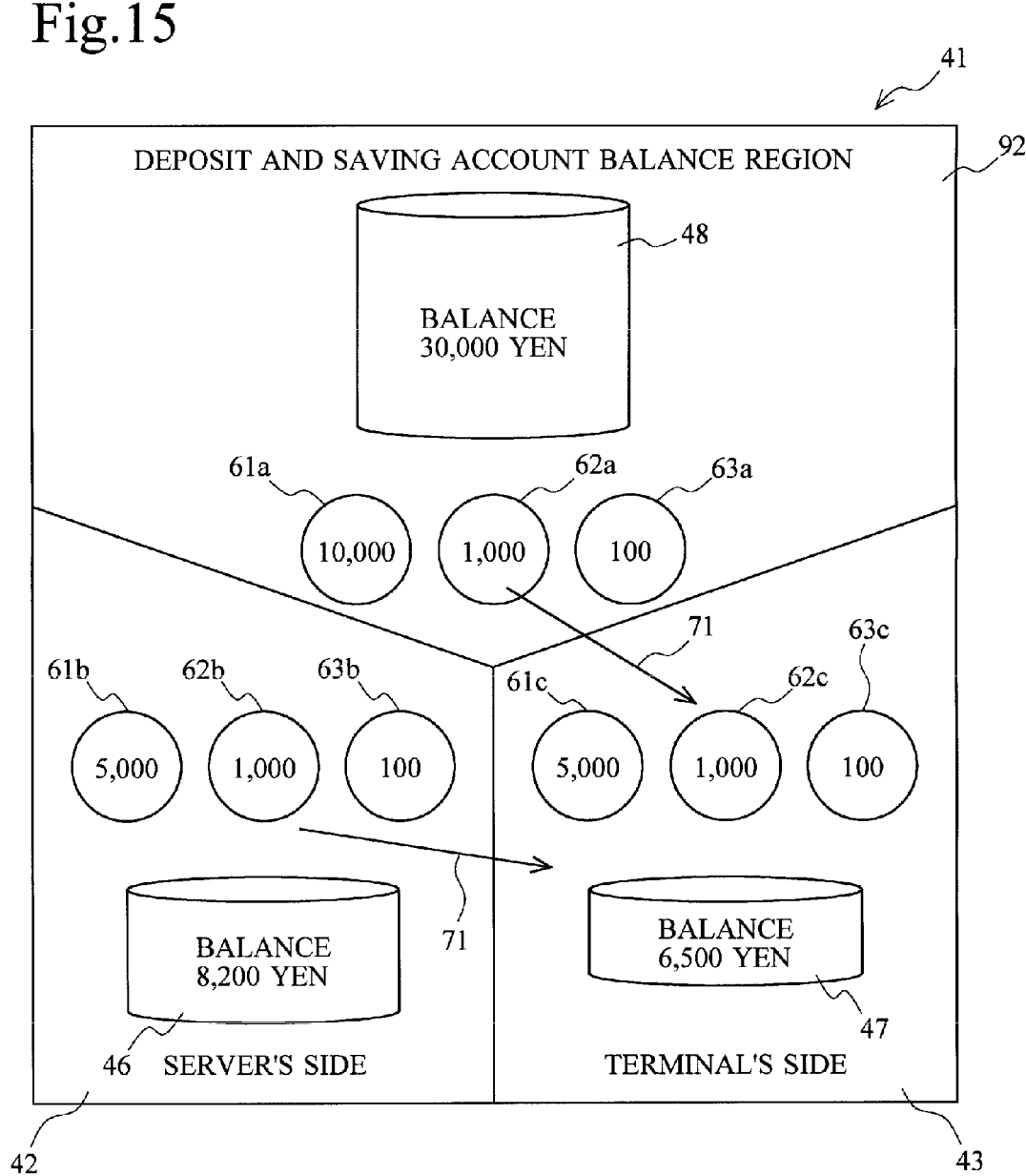
FIG. 15 is a diagram for explaining another example of the value transfer screen.

In FIG. 15, an example in which the deposit and saving account balance region 92 is provided in the example depicted in FIG. 8 is depicted.

In this example depicted in FIG. 15, as is the case with the examples depicted in FIGS. 13 and 14, it is possible to transfer (recharge) value from a deposit account of a bank or the like directly to the terminal's side.

Input of the transfer amount (the unit amount and the number of units) and the transfer direction on the value transfer screen 41 in this example depicted in FIG. 15 is performed in a manner similar to the example depicted in FIG. 8.

Moreover, the processing to display the display 48 of the deposit balance of a bank account or the like in the deposit and saving account balance region 92 of the portable terminal 5 is similar to that of the examples depicted in FIGS. 13 and 14.

Furthermore, the electronic money system 1 can also be applied in the following manner to a case where the general-purpose IC chip 25 is formed in an electronic money card.

In this case, the portable terminal 5 includes a reader/writer that performs short-distance radio communication with the general-purpose IC chip 25 in the electronic money card or has a connecting terminal that is physically connectable thereto.

Then, the portable terminal 5 connects to the general-purpose IC chip 25 in the electronic money card and the electronic money server 2 and performs transfer of value between the terminal-side value balance stored in the general-purpose IC chip 25 in the electronic money card and the server-side value balance of the electronic money server 2.

As described above, the electronic money system 1 is a hybrid system of a stored value-type electronic money system and a center management-type electronic money system and individually manages the electronic money balance on the side of the general-purpose IC chip 25 and the side of the electronic money server 2.

Then, it is possible to transfer value between the side of the general-purpose IC chip 25 and the side of the electronic money server 2 with arbitrary timing in response to the user's operation.

Moreover, adopting a user interface for intuitive operation in the portable terminal 5 makes possible an intuitive operation which is close to exchange of cash in terms of sense, which makes it possible to save user's trouble and reduce the user's burden.

EXPLANATIONS OF LETTERS OR NUMERALS

1 electronic money system
2 electronic money server
3 the Internet
5 portable terminal
6 payment terminal
7 asynchronous payment terminal
8 communication line
11 CPU
12 ROM
13 RAM
14 input section
15 output section
16 communication controlling section
17 short-distance communication controlling section
18 storing section
19 bus line
21 subscriber information IC chip
22 information processing section
23 storing section
25 general-purpose IC chip
26 information processing section
27 storing section
29 electronic money application
31 CPU
32 ROM
33 RAM
34 communication controlling section
35 storing section
36 bus line
41 value transfer screen
42 server-side value balance region
43 terminal-side value balance region
45 unit amount region
46 balance display
47 balance display
48 display of the deposit balance
51 virtual store server
53 touch panel
54 display
55 user interface
61 to 63 icon
92 deposit and saving account balance region

The invention claimed is:
1. An information processing device comprising:
at least one memory operable to store computer program code;
at least one processor operable to read said computer program code and operate according to said program code, the program code including:
displaying code configured to cause at least one of said at least one processor to display one or more objects, each indicating a unit amount, in a predetermined position on a screen;
detecting code configured to cause at least one of said at least one processor to detect a user instruction position on the screen;
region identifying code configured to cause at least one of said at least one processor to identify a display region of the object, the display region including the user instruction position;

direction identifying code configured to cause at least one of said at least one processor to identify a direction of a slide shift when, from a state in which the user instruction position is included in the identified display region, the user instruction position or another user instruction position detected by the detecting code is slid; and instructing code configured to cause at least one of said at least one processor to perform transfer of value identified by using a transfer amount of value determined by using the unit amount indicated by the object corresponding to the identified display region and a transfer direction of value determined based on the identified direction of the slide shift, wherein the displaying code is further configured to cause at least one of said at least one processor to dispose two or more regions on the screen, the two or more regions respectively corresponding to two or more values, and display the one or more objects in a position overlapping a boundary line or a boundary region of the two regions, when the user instruction position detected is slid from a state in which the user instruction position is not included in any of the identified display region, the region identifying code is further configured to cause at least one of said at least one processor to identify a display region of the object including the user instruction position on a trajectory of the slide shift, when the user instruction position is further slid from a state in which the user instruction position is included in the identified display region, the direction identifying code is further configured to cause at least one of said at least one processor to identify a direction from a first region indicating a rear region with respect to a travelling direction of the slide shift to a second region indicating a front region, and the instructing code is further configured to cause at least one of said at least one processor to determine a direction from a first value corresponding to the first region to a second value corresponding to the second region as the transfer direction of value.

2. The information processing device according to claim 1, wherein
when the direction of the slide shift is identified by the direction identifying code multiple times by a predetermined point of time after the display region of the object is first identified by the region identifying code, the instructing code is further configured to cause at least one of said at least one processor to determine the transfer amount of value by using an accumulated amount which is obtained by performing addition of the unit amounts indicated by the objects corresponding to the display regions identified by the region identifying code a number of times the direction of the slide shift is identified by the direction identifying code.

3. The information processing device according to claim 2, wherein
the instructing code is further configured to cause at least one of said at least one processor to calculate an accumulated amount which is obtained by performing addition of the unit amounts a number of times the direction of the slide shift is identified by the direction identifying code from a point of time at which the display region is identified by the region identifying code for each unit amount indicated by the object corresponding to the display region identified by the region identifying code to a predetermined point of time and determines the transfer amount of value by using a total amount of the accumulated amounts.

4. The information processing device according to claim 2, wherein
the instructing code is further configured to cause at least one of said at least one processor to add the unit amounts as negative values a number of times a direction opposite to a direction identified first by the direction identifying code is identified.

5. The information processing device according to claim 2, wherein
when the direction identifying code identifies, at almost a same time, directions of a plurality of slide shifts occurred at almost a same time, a number of the slide shifts identified at almost the same time is counted as a number of times the direction of the slide shift is identified.

6. The information processing device according to claim 1, wherein
when a display region of a same object is consecutively identified multiple times by the region identifying code before the direction of the slide shift is identified by the direction identifying code, the instructing code is further configured to cause at least one of said at least one processor to determine the transfer amount of value by using an accumulated amount obtained by addition of the unit amount indicated by the object corresponding to the identified display region a number of times the display region is identified.

7. The information processing device according to claim 6, wherein
when the direction of the slide shift is identified by the direction identifying code multiple times, the instructing code is further configured to cause at least one of said at least one processor to calculate an accumulated amount obtained by addition of a unit amount a number of times a same display region is identified by the region identifying code from a predetermined point of time before a direction is identified for each of the directions of the slide shifts identified by the direction identifying code to a point of time at which the direction is identified, the unit amount indicated by the object corresponding to the identified display region, and determine the transfer amount of value by using a total amount of the accumulated amounts.

8. The information processing device according to claim 7, wherein
when a direction opposite to a direction identified first by the direction identifying code is identified, the instructing code is further configured to cause at least one of said at least one processor to add the unit amounts as negative values a number of times a display region is identified by the region identifying code before the opposite direction is identified by the direction identifying code.

9. The information processing device according to claim 1, wherein
when a plurality of different user instruction positions are detected at a same time, the region identifying code is further configured to cause at least one of said at least one processor to identify display regions of a plurality of different objects, each including a corresponding one of the plurality of user instruction positions,
when the plurality of user instruction positions or another user instruction position is slid from a state in which the plurality of different user instruction positions are included in the identified different display regions, the direction identifying code is further configured to cause at least one of said at least one processor to identify the direction of the slide shift, and the instructing code is further configured to cause at least one of said at least one processor to determine the transfer amount of value by using the unit amounts indicated by the plurality of different objects corresponding to the identified different display regions.

10. The information processing device according to claim 1, wherein the direction identifying code is further configured to cause at least one of said at least one processor to identify a direction from the first region indicating a region including a position detected by the detecting code at a point of time before a point of time at which a position of the user instruction positions on a trajectory of the slide shift, the position on a boundary line or in a boundary region of two regions, is detected to the second region indicating a region including a position detected by the detecting code at a later point of time.

11. The information processing device according to claim 1, wherein the direction identifying code is further configured to cause at least one of said at least one processor to identify, by using a state of motion of the slide shift which is calculated from temporal changes in the user instruction position detected by the detecting code, the direction from the first region indicating a rear region with respect to a travelling direction of the slide shift to the second region indicating a front region.

12. The information processing device according to claim 1, further comprising:

determining code configured to cause at least one of said at least one processor to determine whether or not at least one of a balance of electronic value stored on a server's side and a balance of electronic value stored on a side of a storing medium carried by a user is less than or equal to a predetermined amount or less than the predetermined amount; and starting code is further configured to cause at least one of said at least one processor to begin displaying, when the determining code determines that at least one of the balance of electronic value stored on a server's side and the balance of electronic value stored on a side of the storing medium carried by a user is less than the predetermined amount or less than or equal to the predetermined amount.

13. The information processing device according to claim 1, wherein the displaying code is further configured to cause at least one of said at least one processor to change the unit amounts indicated by the objects displayed on the screen in accordance with at least one of a balance of electronic value stored on a server's side and a balance of electronic value stored on a side of a storing medium carried by a user.

14. The information processing device according to claim 1, wherein the displaying code is further configured to cause at least one of said at least one processor to display, on the screen, at least one object indicating, as a unit amount, an amount obtained by predetermined numerical calculation which is performed on at least one of a balance of electronic value stored on a server's side and a balance of electronic value stored on a side of a storing medium carried by a user.

15. An information processing method performed by a computer, the method comprising:

displaying one or more objects, each indicating a unit amount, in a predetermined position on a screen;

identifying a display region of the object, the display region including a user instruction position detected on the screen;

identifying a direction of a slide shift when the detected user instruction position or another user instruction position is slid from a state in which the user instruction position is included in the identified display region; and transferring value identified by using a transfer amount of value determined by using the unit amount indicated by the object corresponding to the identified display region and a transfer direction of value determined based on the identified direction of the slide shift, wherein the displaying further includes disposing two or more regions on the screen, the two or more regions respectively corresponding to two or more values, and display the one or more objects in a position overlapping a boundary line or a boundary region of the two regions, when the user instruction position detected is slid from a state in which the user instruction position is not included in any of the identified display region, the identifying a display region further includes identifying a display region of the object including the user instruction position on a trajectory of the slide shift, when the user instruction position is further slid from a state in which the user instruction position is included in the identified display region, the direction identifying further includes identifying a direction from a first region indicating a rear region with respect to a travelling direction of the slide shift to a second region indicating a front region, and the transferring further includes determining a direction from a first value corresponding to the first region to a second value corresponding to the second region as the transfer direction of value.

16. A non-transitory computer readable medium storing a program causing a computer to:

display one or more objects, each indicating a unit amount, in a predetermined position on a screen;

identify a display region of the object, the display region including a user instruction position detected on the screen;

identify a direction of a slide shift when the user instruction position or another user instruction position detected is slid from a state in which the user instruction position is included in the identified display region; and transfer of value identified by using a transfer amount of value determined by using the unit amount indicated by the object corresponding to the identified display region and a transfer direction of value determined based on the identified direction of the slide shift, wherein the display further includes disposing two or more regions on the screen, the two or more regions respectively corresponding to two or more values, and display the one or more objects in a position overlapping a boundary line or a boundary region of the two regions, when the user instruction position detected is slid from a state in which the user instruction position is not included in any of the identified display region, the identification of a display region further includes identifying a display region of the object including the user instruction position on a trajectory of the slide shift, when the user instruction position is further slid from a state in which the user instruction position is included in the identified display region, the direction identification further includes identifying a direction from a first region indicating a rear region with respect to a travelling direction of the slide shift to a second region indicating a front region, and the transfer further includes determining a direction from a first value corresponding to the first region to a second value corresponding to the second region as the transfer direction of value.

\* \* \* \* \*